US012037062B2

(12) United States Patent
Di Biase et al.

(10) Patent No.: US 12,037,062 B2
(45) Date of Patent: Jul. 16, 2024

(54) TRAILER STAND

(71) Applicant: IDEAL WAREHOUSE INNOVATIONS, INC., Vaughan (CA)

(72) Inventors: Joseph J. Di Biase, Vaughan (CA); Timothy Hing-Yan Chung, Mississauga (CA)

(73) Assignee: IDEAL WAREHOUSE INNOVATIONS, INC., Vaughan (CA)

( * ) Notice: Subject to any disclaimer, the term of this patent is extended or adjusted under 35 U.S.C. 154(b) by 8 days.

(21) Appl. No.: 17/799,876

(22) PCT Filed: Feb. 12, 2021

(86) PCT No.: PCT/CA2021/050153
§ 371 (c)(1),
(2) Date: Aug. 15, 2022

(87) PCT Pub. No.: WO2021/159212
PCT Pub. Date: Aug. 19, 2021

(65) Prior Publication Data
US 2023/0077206 A1    Mar. 9, 2023

Related U.S. Application Data

(60) Provisional application No. 62/975,810, filed on Feb. 13, 2020.

(51) Int. Cl.
*B62D 53/08* (2006.01)
(52) U.S. Cl.
CPC ............................... *B62D 53/0864* (2013.01)
(58) Field of Classification Search
CPC ............ B62D 53/0871; B62D 53/0864; B62D 53/0857; B62D 53/06; B60D 1/665;
(Continued)

(56) References Cited

U.S. PATENT DOCUMENTS 3,197,235 A    7/1965   Chieger
10,065,689 B2  9/2018   Wiegel
(Continued)

FOREIGN PATENT DOCUMENTS

CN    208279257 U  * 12/2018
CN    208279257 U    12/2018
(Continued)

OTHER PUBLICATIONS

International Search Report and Written Opinion dated Apr. 27, 2021 for corresponding International Application No. PCT/CA2021/050153.
(Continued)

*Primary Examiner* — Amy R Weisberg
*Assistant Examiner* — Matthew D Lee
(74) *Attorney, Agent, or Firm* — TAROLLI, SUNDHEIM, COVELL & TUMMINO L.L.P.

(57) ABSTRACT

The present disclosure is directed to a trailer stand for a semi-trailer comprising a frame having a front end, a back end, the front end having a pair of front legs and the back end having a pair of back legs; a wheel assembly having a wheel assembly frame, the wheel assembly frame comprising at least two wheels; a pair of stepped assemblies, each of the pair of stepped assemblies connected to the top of one of the pair of front legs and one of the pair of back legs, the pair of stepped assemblies providing a plurality of landing areas for an underside of the semi-trailer; and a lifting system connected to the wheel assembly and to the frame, the lifting system configured to raise and lower the frame relative to the wheel assembly.

20 Claims, 14 Drawing Sheets

(58) Field of Classification Search
CPC ..... B60D 1/66; B60S 9/18; B60S 9/22; B60S 9/02; B62B 3/002
See application file for complete search history.

(56) References Cited

U.S. PATENT DOCUMENTS

| | | | |
|---|---|---|---|
| 11,180,330 B2* | 11/2021 | Kimener | ................... B60S 9/20 |
| 2003/0132061 A1 | 7/2003 | Garcia | |
| 2014/0166950 A1 | 6/2014 | Weigel et al. | |
| 2014/0252194 A1* | 9/2014 | Hopkins | ............ B62D 53/0857 |
| | | | 248/354.1 |
| 2018/0354471 A1* | 12/2018 | Di Biase | ................ B60D 1/665 |
| 2019/0308855 A1* | 10/2019 | Wiegel | .................. B60B 33/063 |
| 2020/0398910 A1* | 12/2020 | Di Biase | ............ B62D 53/0842 |
| 2023/0347698 A1* | 11/2023 | Zutler | .................... B60D 1/665 |

FOREIGN PATENT DOCUMENTS

| | | |
|---|---|---|
| EP | 1712444 | 10/2006 |
| FR | 2928321 A1 | 9/2009 |
| GB | 2220973 A | 1/1990 |

OTHER PUBLICATIONS

Extended European Search Report dated Feb. 9, 2024 for EP Application No. 21753437.9.

* cited by examiner

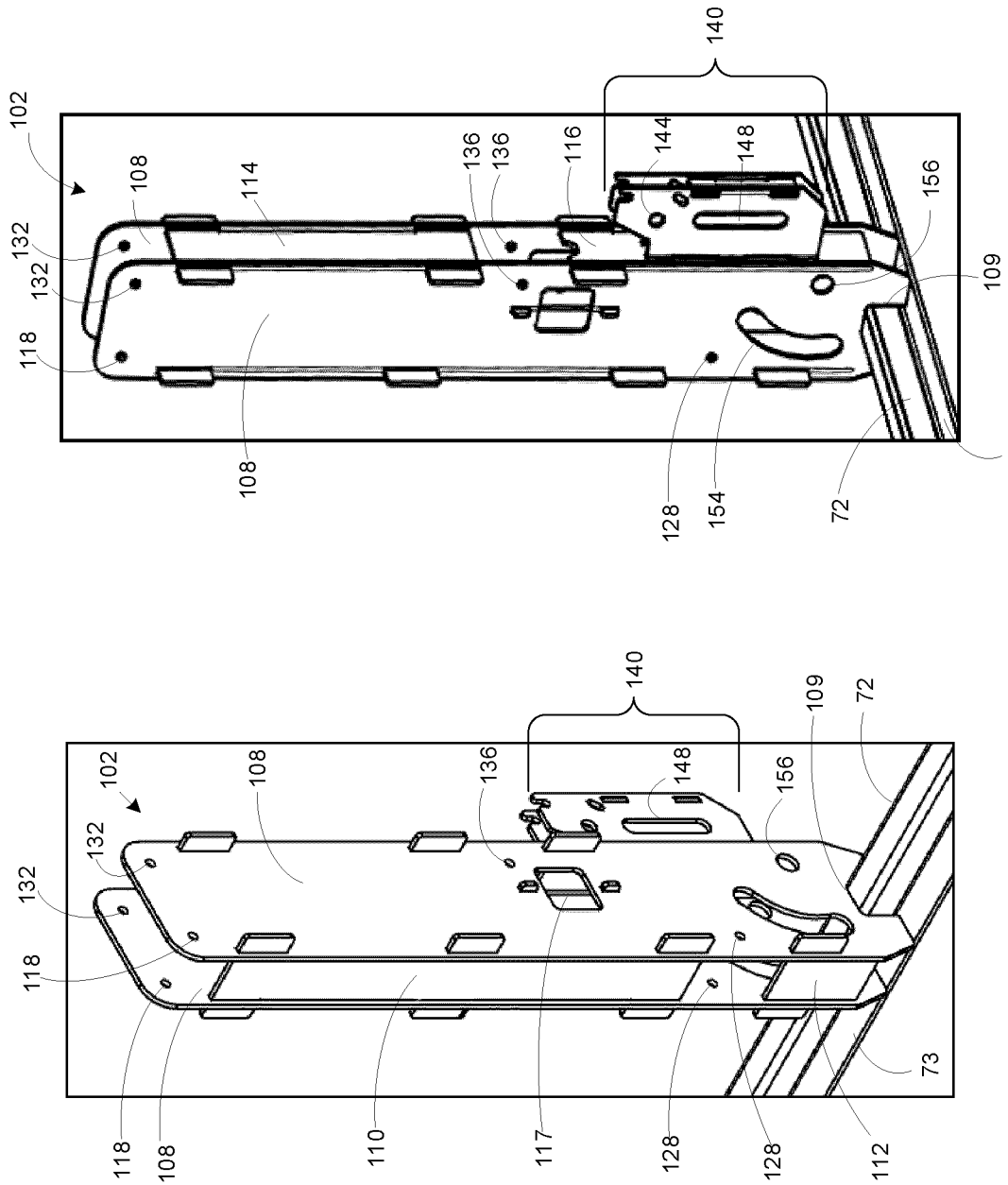

TRAILER STAND

RELATED APPLICATIONS

The present application is a U.S. National Stage application under 35 USC 371 of PCT Application Serial No. PCT/CA2021/050153, filed on 12 Feb. 2021, which claims priority from U.S. Provisional Patent Application No. 62/975,810, filed 13 Feb. 2020, the entirety of both of which are incorporated herein by reference.

FIELD

The present disclosure relates to trailer stands for semi-trailers.

BACKGROUND

When a freight semi-trailer is set down on its landing gear, the semi-trailer is freestanding, i.e., without a mechanical connection between the kingpin of the trailer and the shunt truck. Associated pneumatic and electrical connections between the truck and trailer are disconnected so that the brakes of the freight trailer are locked. The trailer is left adjacent to the dock opening, supported at the front end using only the trailers landing gear.

When docked, semi-trailers require stabilization especially as they are being loaded and unloaded. For semi-trailers that will be loaded or unloaded using a forklift, a trailer stand is required to distribute load in case of collapse of the trailers landing gear. When loading and unloading cargo from a freestanding freight trailer, the movement of the forklifts and loads along the floor of the semi-trailer causes the semi-trailer to move as well. Significant movement can result in the trailer separating from the dock or possibly tipping over. The landing gear of the freight trailer is not designed to accommodate the weight of a fully loaded trailer, let alone the dynamic forces generated by a forklift moving through a partially loaded trailer. The high center of gravity associated with most trailers makes the likelihood of tipping over a real possibility. Tipping of the trailer can result in damage to any goods within the trailer, the trailer itself, and the forklift, as well as injury to, or death of, the operator.

The background herein is included solely to explain the context of the disclosure. This is not to be taken as an admission that any of the material referred to was published, known, or part of the common general knowledge as of the priority date.

SUMMARY

In accordance with an aspect, there is provided a trailer stand for a semi-trailer comprising: a frame having a front end, a back end, the front end having a pair of front legs and the back end having a pair of back legs; a wheel assembly having a wheel assembly frame, the wheel assembly frame having at least two wheel bars connected to a center bar, each of the at least two wheel bars having a front wheel and a back wheel; a pair of stepped assemblies, each of the pair of stepped assemblies connected to the top of one of the pair of front legs and one of the pair of back legs, the pair of stepped assemblies providing a plurality of landing areas for an end of the semi-trailer; and a lifting system connected to the center bar of the wheel assembly and the front end of the frame, the lifting system configured to lift and lower the frame.

In an embodiment, each landing area has a tread to act as a catch-zone for an underside of a semi-trailer and a riser to abut a vertical wall of the semi-trailer.

In an embodiment, the lifting system comprises an inner housing within an outer housing, the inner housing connected to the center bar, the outer housing connected to the front end of the frame, the outer housing configured to move to upwards to lift the frame.

In an embodiment, the outer housing is configured to move upwards via a gas spring fixed to the inner housing.

In accordance with an aspect, there is provided a trailer stand comprising a frame, a lifting system, a wheel assembly, and two stepped landing assemblies.

In an embodiment, the frame comprises two leg assemblies at each side of the trailer stand.

In an embodiment, each of the two leg assemblies comprises a front leg and a back leg.

In an embodiment, each front leg and each back leg comprises two elongated metal plates connected substantially along one of their lengths to an inside elongated metal plate and connected along one of their widths to a bottom base plate, such that the two elongated metal plates are normal to the bottom base plate.

In an embodiment, each bottom base plate sits on a ground surface, when positioned on the ground.

In an embodiment, each front leg and each back leg is a substantially U-shaped channel.

In an embodiment, each front leg and each back leg is a substantially tubular shape.

In an embodiment, each front leg and each back leg is connected by at least one cross support.

In an embodiment, each front leg and each back leg is connected by two cross supports.

In an embodiment, each cross support is connected to a gusset.

In an embodiment, each cross support is connected to a gusset under each cross support where the cross support connects to each leg.

In an embodiment, each leg assembly is connected by a plurality of cross supports.

In an embodiment, the plurality of cross supports traverses the width of the trailer stand.

In an embodiment, the plurality of cross supports creates the frame around the lifting system.

In an embodiment, the frame comprises a top front cross support.

In an embodiment, the top front cross support is connected to the upper portion of each front leg.

In an embodiment, the frame comprises a bottom front cross support.

In an embodiment, the bottom front cross support is connected to the lower portion of each front leg.

In an embodiment, the frame comprises a top back cross support.

In an embodiment, the top back cross support is connected to the lower portion of each back leg.

In an embodiment, the top back cross support comprises a handle.

In an embodiment, the frame comprises two angled cross braces.

In an embodiment the two angled cross braces connect the top front cross support to the bottom front cross support.

In an embodiment, the frame comprises two angled cross braces.

In an embodiment, the two angled cross braces connect the top front cross support to the top back cross support.

In an embodiment, each leg assembly supports a stepped landing assembly.

In an embodiment, the stepped landing assembly comprises two substantially symmetrical stepped walls.

In an embodiment, the bottom of each stepped wall has, at each end, a downward arm.

In an embodiment the downward arm fits within the channels created by the back and front legs.

In an embodiment, each of the downward arms are connected by an elongated metal plate, thereby connecting the two stepped walls, to form the stepped landing assembly.

In an embodiment, each of the downward arms has a plurality of holes which substantially align with the holes in the back and front legs, to connect and lock the stepped landing assembly to the back and front legs, allowing the stepped landing assembly to be adjusted for height.

In an embodiment, the legs comprise two holes to align with the holes in the stepped landing assembly.

In an embodiment, the top of each of the stepped walls comprises treads and risers, which align when each stepped wall is assembled to form the stepped wall assembly.

In an embodiment, the aligned treads and risers form stages or steps.

In an embodiment, a sloped plate connects the tops of each stepped wall below each riser.

In an embodiment, the top of the back of the stepped wall assembly comprises a stop plate, which is substantially higher than the top riser of the stepped wall assembly.

In an embodiment, the pair of stepped assemblies creates matched stepped landing areas on each side of the stand.

In an embodiment, the steps and/or risers comprise bumpers.

In an embodiment, the bumpers comprise shock absorbent material.

In an embodiment, the bumpers comprise rubber.

In an embodiment, the lifting system is attached to the wheel assembly.

In an embodiment, the wheel assembly comprises a frame which comprises a pair of wheel bars connected to a center bar.

In an embodiment, each pair of wheel bars comprises a front wheel or caster and a back wheel or caster.

In an embodiment, the front wheels or casters and/or the back wheels or casters comprise a locking mechanism or brake.

In an embodiment, the center bar sits on a center base plate.

In an embodiment, the trailer stand comprises four wheels or casters.

In an embodiment, the lifting system is connected to the center bar.

In an embodiment, the lifting system comprises an outer housing.

In an embodiment, the outer housing is substantially oblong.

In an embodiment, the outer housing comprises two side plates, a front plate and a back plate, which are connected at their edges to form a box or tube shape.

In an embodiment, the outer housing comprises a top plate.

In an embodiment, the two side plates are substantially symmetrical.

In an embodiment, a portion of each of the two side plates extends past the front plate to form a notch.

In an embodiment, the notch accommodates and connects to the top front cross support.

In an embodiment, a portion of each of the two side plates extends pats the front plate to form another notch which may accommodate and connect to the bottom front cross support.

In an embodiment, the side plates comprise a bottom protrusion having a slot to accommodate a connection to a lever on the inside surface of the side plate.

In an embodiment, the connection to the lever is via a clevis pin through the slot and an appropriate pin to secure the clevis pin.

In an embodiment, the side plates comprise a protrusion extending past the back plate.

In an embodiment, the protrusion, on each side plate, has a hole for accommodating a bolt 100 therethrough to connect a portion of an inner housing to the outer housing.

In an embodiment, the bolt acts in conjunction with a pedal to lock the frame when moved from a lowered position, wherein the trailer stand is in the supporting or stabilizing position, to a raised position, wherein the trailer stand is in the portable position, which will be discussed in further detail below.

In an embodiment, the outer housing of the lifting system comprises therein an inner housing.

In an embodiment, the inner housing houses a drive mechanism.

In an embodiment, the drive mechanism is a jack screw assembly.

In an embodiment, the drive mechanism is a gas spring or shock.

In an embodiment, the drive mechanism is activated by a lever.

In an embodiment, the inner housing comprises two side plates connected by a first front plate and a second front plate at their fronts, and by a first back plate and a second back plate at their backs.

In an embodiment, the front plates and the back plates are connected to the side plates via tabs in notches.

In an embodiment, the bottom of each of the side plates has a notch to accommodate and connect to the center bar.

In an embodiment, the spring is connected at its bottom end to an inner plate in the inner housing.

In an embodiment, the inner plate traverses the width of the space between, and is connected to, the two side plates.

In an embodiment, the spring is connected to the top of the outer housing by a top center plate, which traverses the width of the space between the two side plates of the outer housing.

In an embodiment, the spring protrudes through the top plate of the outer housing.

In an embodiment, the first front plate is positioned to allow a top front pair of wheels to engage the inside surface of the front plate of the lifting system outer housing.

In an embodiment, the top front pair of wheels are on an axle, which is accommodated in the side plates by a hole therethrough.

In an embodiment, the second front plate is positioned below the first front plate to leave a space to allow a bottom front pair of wheels to engage the inside surface of the front plate of the lifting system outer housing.

In an embodiment, the bottom front pair of wheels are on an axle, which is accommodated in the side plates by holes therethrough.

In an embodiment, the first back plate is positioned to allow a top back pair of wheels to engage the inside surface of the back plate of the lifting system outer housing.

In an embodiment, the top back pair of wheels are on an axle, which is accommodated in the side plates by a hole therethrough.

In an embodiment, the second back plate is positioned below the first back plate to leave a space to allow a bottom back pair of wheels to engage the inside surface of the back plate of the lifting system outer housing.

In an embodiment, the bottom back pair of wheels are on an axle, which is accommodated in the side plates by a hole therethrough.

In an embodiment, the bottom back pair of wheels engages the inner plate in the inner housing on the opposite side to the back plate.

In an embodiment, the lifting system comprises 4 pairs of wheels.

In an embodiment, each of the side plates comprises a curved slot.

In an embodiment, the curved slots accommodate a clevis pin therethrough and locked in place by an appropriate pin.

In an embodiment, the curved slots align with a hole in the end of the lever, thereby holding the end of the lever, such that the end of the lever sits between the outer housing and the inner housing.

In an embodiment, the side plates each have a hole for accommodating a clevis pin therethrough and locked in place by an appropriate pin.

In embodiment, the holes on the side plates align with a hole at a midway point on the lever arms which also accommodate the clevis pin which acts as an axis of rotation for the lever.

In an embodiment, the lever has two bent arms.

In an embodiment, the arms have a hole at their ends to accommodate a clevis pin.

In an embodiment, the arms have another hole at a substantially midway point on the arm to accommodate a clevis pin.

In an embodiment, the lever accommodates a handle at the opposite end thereof.

In an embodiment, the second back plate has slots to allow for the connection of a bracket.

In an embodiment, the bracket comprises two plates.

In an embodiment, the two plates fit into slots in the second back plate.

In an embodiment, the two plates have a hole to accommodate a bolt, traversing the holes therethrough in each plate to which the pedal is pivotally connected and which acts as the axis of rotation for the pedal.

In an embodiment, the two plates have a substantially oblong slot which accommodates the bolt, allowing the bolt to slide up and down the oblong slot, thereby allowing the outer housing to move up and down, which in turn moves the frame up and down.

In an embodiment, the pedal is substantially L-shaped, having a foot pad for depression by an operators foot.

In an embodiment, the pedal comprises a hook at one end to automatically engage and lock the bolt when the outer housing is moved up, thereby moving and locking the frame in the raised position, wherein the trailer stand is in the portable position.

In accordance with an aspect, there is provided a trailer stand for a semi-trailer comprising: a frame assembly having a front pair of legs and a back pair of legs, the front pair of legs connected by a front cross support and the back pair of legs connected by a back cross support; a wheel assembly having a wheel assembly frame, the wheel assembly frame having a first end and a second end; a stepped assembly having a front end, a back end, a top, and a bottom, the front end moveably coupled to the front pair of legs, the back end moveably coupled to the back pair of legs, the top of the stepped assembly providing a plurality of landing areas for an underside of the semi-trailer; and a lifting mechanism operatively coupled with the frame assembly via a linkage, the lifting mechanism configured to move the frame assembly from a lowered position to a raised position.

In an embodiment, each landing area has a riser to abut a vertical wall of the trailer.

In an embodiment, each riser has a bumper to contact the vertical wall of the trailer.

In an embodiment, the stepped assembly is secured to the frame at a desired vertical height above and relative to the upper end of the frame.

In an embodiment, each leg of the front pair of legs and the back pair of legs comprises a bottom plate on the bottom thereof.

In an embodiment, the bottom plate is in contact with a ground surface.

In an embodiment, the bottom plate is connected to bumpers that are in contact with a ground surface.

In accordance with an aspect of the present invention, there is provided a trailer stand comprising: a lifting frame assembly comprising a pair of substantially vertical front legs, a pair of substantially vertical back legs, a front cross support connected to each front leg and a back cross support connected to each back leg; a pair of stepped landing assemblies, each stepped landing assembly comprising a base, an inside stepped side wall having a front end, a back end, a bottom and a top shaped to have a plurality of treads and risers, an outside stepped side wall having a front end, a back end, a bottom and a top shaped to have a plurality of treads substantially corresponding in length to the plurality of treads of the inside stepped side wall and a plurality of risers substantially corresponding in height to the plurality of risers of the inside stepped side wall, wherein the inside stepped side wall and the outside stepped side wall are connected to the sides of the base the treads and risers of the inside stepped side wall and the treads and risers of the outside step side wall substantially align on each side of the base forming steps, and wherein one end of the base sits atop, and is connected to, one of the front legs and the other end of the base sits atop, and is connected to, one of the back legs, such that the base traverses the gap between the front leg and the back leg; and a wheel assembly coupled to the lifting frame assembly.

In an embodiment, the bottom plate is shaped to lie substantially flat on a horizontal surface.

In an embodiment, the bottom plate has angled ends.

In an embodiment, the bottom plate is connected to a plurality of bumpers for coming into contact with a ground surface.

In an embodiment, the bottom plate has a plurality of apertures therethrough for connecting to the plurality of bumpers by brackets using fasteners, in an embodiment, nuts and bolts.

In an embodiment, the brackets for connecting the plurality of bumpers to the bottom plate are angle brackets.

In an embodiment, the plurality of bumpers are rubber bumpers.

In an embodiment, the plurality of bumpers are laminated rubber bumpers.

In an embodiment, the plurality of bumpers are molded rubber bumpers.

In an embodiment, the front cross support is reinforced underneath by a gusset connected to each front leg.

In an embodiment, the back cross support is reinforced underneath by a gusset connected to each back leg.

In an embodiment, the frame of the wheel assembly is I-shaped.

In an embodiment, the top riser is higher than the other risers.

In an embodiment, the steps are open.

In an embodiment, the steps are closed.

In an embodiment, the steps are closed with a top or tread that traverses the width and length of the steps.

In an embodiment, a bumper is connected to each of the risers of the inside stepped side wall and the outside stepped side wall, respectively.

In an embodiment, the bumper has a substantially rectangular shape.

In an embodiment, the bumper is made of rubber or plastic.

In an embodiment, the bumper is made of laminated rubber.

In an embodiment, the bumper is made of molded rubber.

In an embodiment, the bumper has boreholes which allow the bumper to be connected to the risers via mounting plates.

In an embodiment, the mounting plate has a substantially rectangular portion with a lower protrusion, which fits within the step formed between the inside stepped side wall and the outside stepped side wall.

In an embodiment, the rectangular portion of the mounting plate, traverses the width of the gap between the risers of the inside stepped side wall and the risers of the outside stepped side wall.

In an embodiment, the rectangular portion of the mounting plate has boreholes that align with the boreholes of the bumper to allow for connection by fasteners, in an embodiment, bolts and nuts.

In an embodiment, the bumper may be connected to the mounting plates by adhesive.

In an embodiment, the mounting plates are welded to the risers such that the mounting plates traverse the width of the base, from the inside stepped side wall to the outside stepped side wall, thereby connecting the two stepped side walls at each of the risers.

In an embodiment, the rectangular portions of the mounting plates are of a length that extends beyond the inside stepped side wall and the outside stepped side wall.

In an embodiment, the pair of stepped assemblies creates matched stepped landing areas on each side of the trailer stand.

In accordance with an aspect, there is provided a portable trailer stand for supporting and/or stabilizing a trailer parked on a driveway, the trailer having an underside, the portable trailer stand comprising: a frame having a front end, a back end, the front end having a pair of front legs and the back end having a pair of back legs; a wheel assembly having a wheel assembly frame, the wheel assembly frame having at least two wheels connected thereto; a pair of stepped assemblies, each of the pair of stepped assemblies connected to the top of one of the pair of front legs and one of the pair of back legs, the pair of stepped assemblies providing a plurality of landing areas for the underside of the trailer; and a lifting system connected to the wheel assembly and the front end of the frame, the lifting system configured to raise and lower the frame relative to the wheel assembly.

In accordance with an aspect, there is provided a portable trailer stand for supporting and/or stabilizing a trailer parked on a driveway, the trailer having an underside, the portable trailer stand comprising: a wheel assembly comprising at least one wheel; an extendible frame assembly having an upper end, the frame being vertically movable relative to the wheel assembly movable to selectively engage and disengage the underside of the trailer; a first leg on the frame and moveable therewith; a first foot on the first leg and moveable therewith to selectively engage and disengage the driveway.

In accordance with an aspect of the present invention, there is provided a portable trailer stand for supporting and/or stabilizing a trailer parked on a driveway, the trailer having an underside, the portable trailer stand comprising: a wheel assembly comprising at least one wheel; a frame having an upper end and a lower end, the lower end of the frame being moveably coupled to the wheel assembly such that the frame is vertically moveable relative to the wheel assembly; at least one stepped landing assembly moveably coupled to the upper end of the frame and being vertically movable relative to the frame to selectively engage and disengage the underside of the trailer; at least one leg on the frame and moveable therewith; a foot on the at least one leg and moveable therewith to selectively engage and disengage the driveway; and a lifting mechanism coupled to the at least one wheel and to the frame for vertically lifting the frame from a first position wherein the foot is engaged with the driveway and at least a second position wherein the foot is disengaged from the driveway.

In an embodiment of the present invention, the at least one wheel is two wheels.

In an embodiment of the present invention, the at least one wheel is three wheels.

In an embodiment of the present invention, the at least one wheel is four wheels.

In an embodiment of the present invention, the wheel assembly comprises a front wheel, a left rear wheel and a right rear wheel, the right rear wheel and the left rear wheel being spaced apart horizontally to provide an open space therebetween.

In an embodiment of the present invention, the wheel assembly comprises a left front wheel, a right front wheel, a left rear wheel and a right rear wheel, the left front rear wheel and the right rear wheel being spaced apart horizontally to provide an open space therebetween and the right rear wheel and the left rear wheel being spaced apart horizontally to provide an open space therebetween.

In an embodiment of the present invention, the right front wheel is rotatable about a front axis, the left front wheel is rotatable about a front axis, the right rear wheel is rotatable about a rear axis and the left rear wheel is rotatable about a rear axis.

In an embodiment of the present invention, the at least one wheel remains at a substantially fixed elevation relative to the driveway regardless of the vertical movement of the frame, the at least one leg and the foot.

In an embodiment of the present invention, the portable trailer stand has selectively at least a portable mode and a supporting mode, a bottom surface of the foot being above a lowermost point of the at least one wheel in the portable mode and the bottom surface of the foot being substantially level with the lowermost point of the at least one wheel in the supporting mode.

In an embodiment of the present invention, the portable trailer stand further has a stabilizing mode, a bottom surface of the foot being substantially level with the lowermost point of the at least one wheel in the stabilizing mode.

In an embodiment of the present invention, the upper end of the frame is elongate in a longitudinal direction, and the portable trailer stand further comprises a second leg moveable with the frame; and a second foot on the second leg and moveable therewith to selectively engage and disengage the driveway.

In an embodiment of the present invention, the lifting mechanism comprises a drive mechanism.

In an embodiment of the present invention, the lifting mechanism comprises a housing at least partially enclosing the drive mechanism.

In an embodiment of the present invention, the housing comprises an inner housing and an outer housing, the outer housing moveably coupled to the inner housing and being vertically movable relative to the inner housing.

In an embodiment of the present invention, the drive mechanism is contained inside the housing and is connected to selectively extend and retract the outer housing relative to the inner housing.

In an embodiment of the present invention, the drive mechanism is a jack screw assembly.

In an embodiment of the present invention, the drive mechanism is a gas spring or gas shock.

In an embodiment of the present invention, the vertical movement of the outer housing relative to the inner housing selectively raises and lowers the frame, the leg and the foot relative to the wheel assembly.

In an embodiment of the present invention, the portable trailer stand further comprises a handle attached to the frame and extending higher than the upper end of the frame.

In an embodiment of the present invention, the portable trailer stand further comprises a swivel mechanism connecting the at least one wheel to the wheel assembly.

In an embodiment of the present invention, the portable trailer stand comprises an anti-swivel connection coupling the front wheel to the wheel assembly; a first swivel mechanism connecting the right rear wheel to the wheel assembly; and a second swivel mechanism connecting the left rear wheel to the wheel assembly.

In an embodiment of the present invention, the portable trailer stand further comprises a sensor system supported by at least one of the frame or the at least one stepped landing assembly, the sensor system providing an output signal indicating whether the portable trailer stand is in one of the supporting mode and the stabilizing mode.

In an embodiment of the present invention, the sensor system comprises a trigger and a visual indicator, the trigger being movable selectively to a raised position and a lowered position relative to the frame, the trigger in the raised position being higher than the upper end of the frame, the trigger being higher in the raised position than in the lowered position relative to the frame, the visual indicator being movable selectively to a retracted position and an extended position in response to the trigger moving between the raised position and the lowered position, the visual indicator being in the retracted position when the portable trailer stand is in the portable mode and the trigger is in the raised position, the visual indicator being in the extended position when the portable trailer stand is in the supporting mode and the trigger is in the retracted position, and the visual indicator being in the extended position when the portable trailer stand is in the stabilizing mode and the trigger is in the lowered position.

In an embodiment of the present invention, the portable trailer stand comprises a lifting mechanism connected to the frame and a mechanical drive unit operatively coupled to the lifting mechanism to selectively raise and lower the frame.

In an embodiment of the present invention, the visual indicator is pivotal between the retracted position and the extended position.

In an embodiment of the present invention, the portable trailer stand further comprises a camera system situated to detect whether the visual indicator is in the extended position.

In accordance with an aspect, there is provided a portable trailer stand for supporting and/or stabilizing a trailer parked on a driveway, the trailer having an underside, the portable trailer stand comprising: a wheel assembly comprising at least one wheel; a frame having an upper end and a lower end, the lower end moveably coupled to the wheel assembly, the upper end being elongate in a longitudinal direction, the frame being vertically movable relative to the wheel assembly, the upper end to selectively engage and disengage the underside of the trailer; a first leg on the frame and moveable therewith; a first foot on the first leg and moveable therewith to selectively engage and disengage the driveway; a second leg on the frame and moveable therewith; a second foot on the second leg and moveable therewith to selectively engage and disengage the driveway; a lifting mechanism coupled to both the wheel assembly and the frame, the lifting mechanism being structured to selectively extend and retract and thereby selectively lower and raise the frame relative to the wheel assembly; and a drive mechanism coupled with the lifting mechanism to extend and retract the lifting mechanism, such that vertical movement of the lifting mechanism selectively raises and lowers the frame, first and second legs and the first and second feet, relative to the wheel assembly, the portable trailer stand having selectively at least a portable mode and a supporting mode, a bottom surface of the first foot and the second foot being above a lowermost point of the at least one wheel in the portable mode and the bottom surface of the first foot and the second foot being substantially level with the lowermost point of the at least one wheel in the supporting mode.

In an embodiment of the present invention, the portable trailer stand has selectively a stabilizing mode wherein the upper end of the frame is engaged with the underside of the trailer and a bottom surface of the first foot and the second foot is substantially level with the lowermost point of the at least one wheel.

In an embodiment, the at least one wheel remains at a substantially fixed elevation relative to the surface regardless of vertical movement of the upper end of the frame.

In an embodiment, the lifting mechanism comprises an outer housing moveably coupled with an inner housing such that the outer housing is configured to move vertically relative to the inner housing.

In an embodiment, the portable trailer stand further comprises a handle attached to the frame and extending higher than the upper end of the frame.

In an embodiment, the wheel assembly further comprises a second wheel; an anti-swivel connection coupling the second wheel to the wheel assembly; a third wheel; and a swivel mechanism coupling the third wheel to the wheel assembly.

In accordance with an aspect, there is provided a portable trailer stand for supporting and/or stabilizing a trailer parked on a driveway, the trailer having an underside, the portable trailer stand comprising: a frame having an upper end, the upper end being vertically movable to selectively engage and disengage the underside of the trailer; a first leg on the frame and moveable therewith; a first foot on the first leg and moveable therewith to selectively engage and disengage the driveway; and at least three wheels connected to the frame and supporting substantially an entire combined weight of the frame, the first leg and the first foot when the upper end is disengaged from the underside of the trailer, the first foot is disengaged from the driveway, and the at least three wheels are resting upon the driveway, the at least three wheels comprise a first wheel having a first lowermost point, a second wheel having a second lowermost point, and a third wheel having a third lowermost point, the first lowermost point and the second lowermost point defining a line, and the third lowermost point being horizontally spaced apart from the line.

In an embodiment, the at least three wheels remain at a substantially fixed distance relative to the surface regardless of vertical movement of the frame, the upper end and the first leg.

In an embodiment, the portable trailer stand has selectively at least a portable mode and an supporting mode, a bottom surface of the first foot being above a first lowermost point of the first wheel in the portable mode and the bottom surface of the first foot being substantially level with the first lowermost point of the first wheel in the supporting mode.

In an embodiment, the portable trailer stand further comprises a stabilizing mode, wherein the bottom surface of the first foot is below the first lowermost point of the first wheel.

In an embodiment, the upper end of the frame is elongate in a longitudinal direction, and the frame further comprises: a second leg moveable with the frame; a second foot on the second leg and moveable therewith to selectively engage and disengage the driveway; a lifting mechanism coupled to the frame and structured to selectively extend and retract thereby selectively lower and raise the frame; and a drive mechanism coupled with the lifting mechanism that selectively raises and lowers the frame relative to the three wheels.

In an embodiment, the portable trailer stand further comprises a handle attached to the frame and extending higher than the upper end of the frame.

In an embodiment, the portable trailer stand further comprises a first swivel mechanism connecting the first wheel to the frame; and an anti-swivel connection coupling the third wheel to the frame.

In an embodiment, the portable trailer stand further comprises a lifting mechanism connected to the frame; and a mechanical drive unit operatively coupled to the lifting mechanism to selectively raise and lower the frame.

In accordance with an aspect, there is provided a portable trailer stand for supporting and/or stabilizing a trailer parked on a driveway, the trailer having an underside, the portable trailer stand comprising: a frame extendible along a vertical axis, the frame having an upper end that is elongate in a longitudinal direction, the upper end being vertically movable to selectively engage and disengage the underside of the trailer; a plurality of wheels coupled to the frame; a first leg coupled to the frame and moveable therewith; a second leg coupled to the frame and moveable therewith; and a lifting mechanism coupled with the frame for extending the frame along the vertical axis.

In an embodiment, the plurality of wheels remain at a substantially fixed elevation relative to the driveway regardless of vertical movement of the frame.

In an embodiment, the portable trailer stand further comprises a handle attached to the frame and extending higher than the upper end of the frame.

In accordance with an aspect, there is provided a portable trailer stand comprising a frame having an upper end; a wheel assembly connected to the frame, the wheel assembly comprising at least one wheel, the at least one wheel to remain at a substantially fixed distance from a surface as the frame is vertically moved; and a leg coupled to the frame, the upper end of the frame being vertically movable to selectively engage and disengage an underside of a trailer parked on the surface based on movement of the frame relative to the wheel.

In an embodiment, the portable trailer stand further comprises a foot connected to a base of the leg, the foot to selectively move a first distance from the lower most point on the wheel and a second distance from the lower most point on the wheel, the first distance being closer to the upper end than a lowermost point on the wheel, the second distance being farther from the upper end than the lowermost point on the wheel.

In an embodiment, the frame comprises a stepped landing assembly, the stepped landing assembly connected to the upper end via the post, the post selectively mountable to the upper end at different heights to selectively adjust the substantially fixed distance between the stepped landing assembly and the upper end.

In an embodiment, the wheel is a first wheel, the upper end being elongate in a longitudinal direction along a vertical plane, the portable trailer stand further comprising: a second wheel connected to the frame; and a third wheel connected to the frame, the first wheel positioned on a first side of the vertical plane, the second and third wheels positioned on a second side of the vertical plane opposite the first side, the second wheel spaced apart from the third wheel in a direction extending parallel to the vertical plane.

In an embodiment, the first wheel is positioned between (1) a first line extending perpendicular to the vertical plane and passing through the second wheel and (2) a second line extending perpendicular to the vertical plane and passing through the third wheel.

In an embodiment, the first wheel is positioned equidistant from the first and second lines.

In an embodiment, the leg is a first leg, the portable trailer stand further comprising a second leg, the first leg positioned on an opposite side of the first line than the first wheel, the second leg positioned on an opposite side of the second line than the first wheel.

In an embodiment, the first and second wheels are spaced substantially a same distance from the vertical plane.

In an embodiment, the portable trailer stand further comprising a handle attached to the frame.

In an embodiment, the handle extends higher than the upper end at a location horizontally offset relative to upper end.

In an embodiment, the portable trailer stand further comprises a sensor system to indicate when the stepped landing assembly is in engagement with the underside of the trailer.

In an embodiment, the sensor system comprises: a visual indicator carried by the frame, the visual indicator moveable between a retracted position and an extended position; and a trigger to move from a first position to a second position in response to the upper end engaging the underside of the trailer, the visual indicator to be in the retracted position when the trigger is in the first position, the visual indicator to move to the extended position in response to the trigger moving to the second position.

In an embodiment, the visual indicator is more visually prominent when in the extended position than when in the retracted position.

In an embodiment, the sensor system includes a switch having a trigger extending above the upper end, the switch to generate an output signal in response to the trigger engaging the underside of the trailer, the output signal indicative of the upper end being in engagement with the underside of the trailer.

In any of the embodiments described above, the bottom base plates or foot plates of the legs may comprise apertures for draining water and/or for lagging the trailer stand to a skid or pallet.

It is understood that one or more of the aspects described herein (and above) may be combined in any suitable manner. The novel features of the present invention will become apparent to those of skill in the art upon examination of the following detailed description of the invention. It should be understood, however, that the detailed description of the invention and the specific examples presented, while indicating certain aspects of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The present invention will be further understood from the following description with reference to the Figures, in which:

FIG. 12 shows a close up perspective view of the inner housing of the lifting system.

FIG. 13 shows another close up perspective view of the inner housing of the lifting system.

DETAILED DESCRIPTION OF CERTAIN ASPECTS

Figure 1:
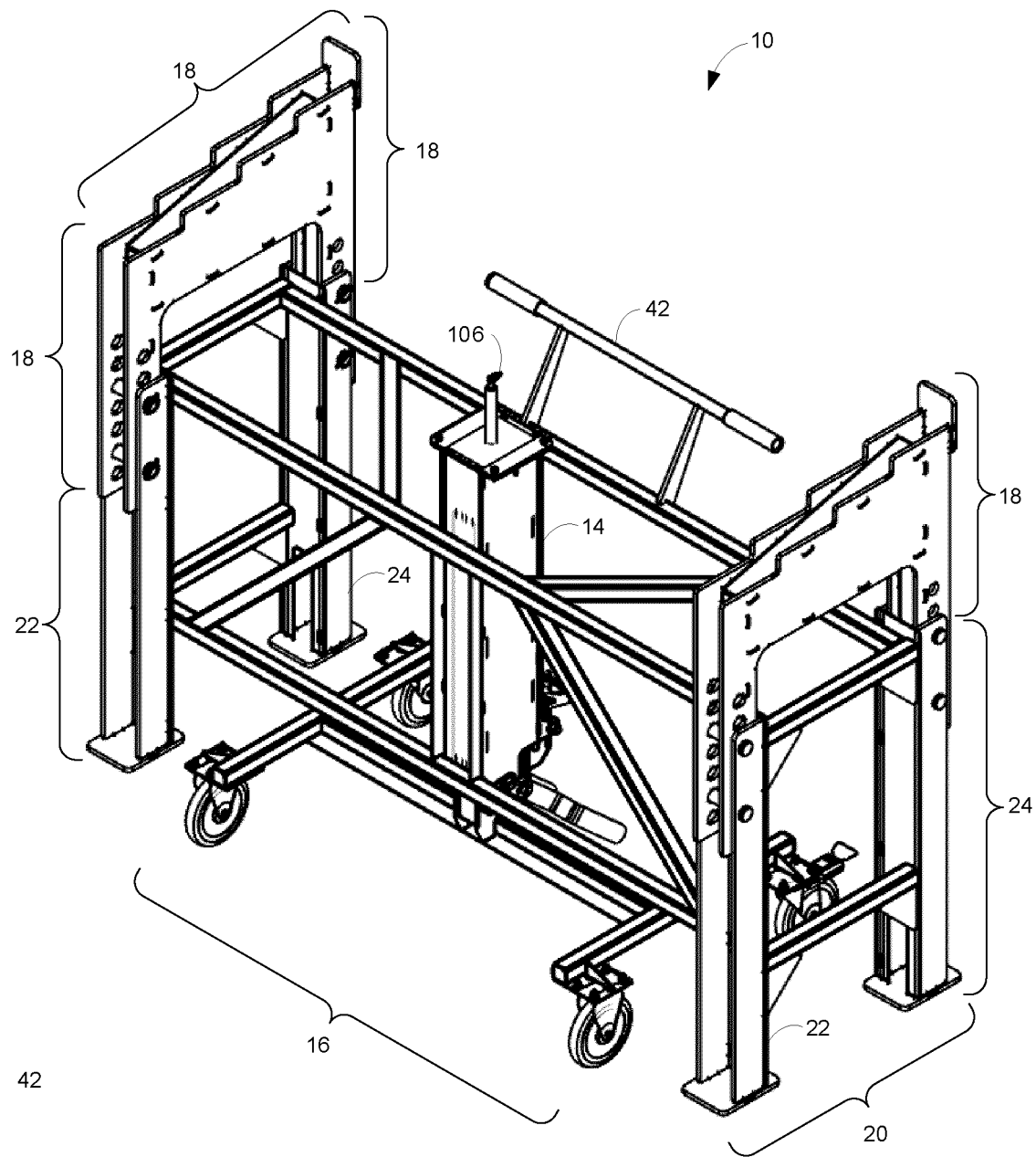
FIG. 1 shows a perspective view of a trailer stand.

Turning now to the drawings, FIGS. 1 to 6 show different views of an exemplary trailer stand 10 of the present invention. Trailer stand 10 comprises a frame 12, a lifting system 14, a wheel assembly 16, and two stepped landing assemblies 18.

Figure 7:
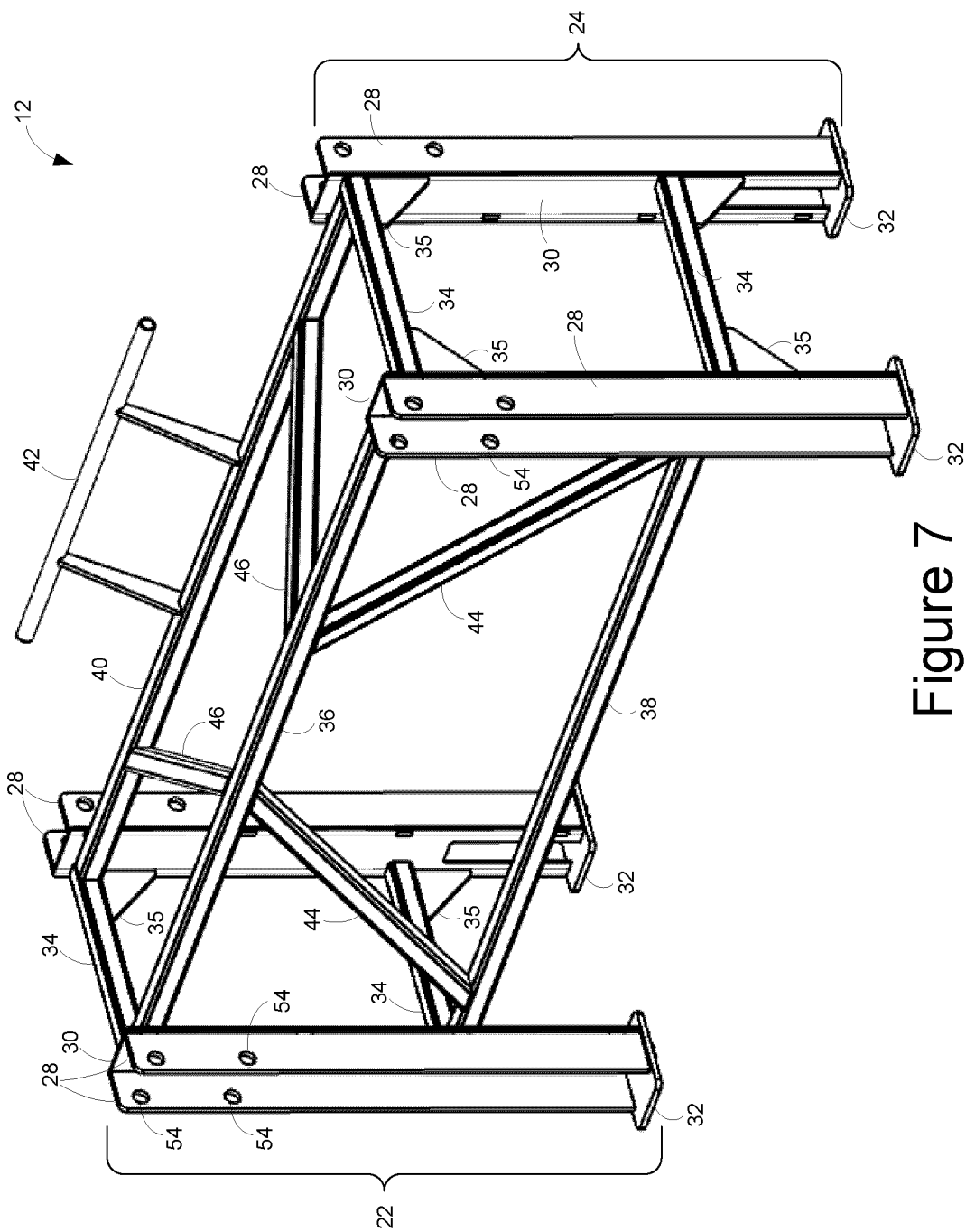
FIG. 7 shows a perspective view of a frame of the trailer stand of FIG. 1.

The frame 12, shown in FIG. 7, comprises two leg assemblies 20 at each side of the trailer stand 10. Each of the leg assemblies 20 may have a front leg 22 and a back leg 24. In this embodiment, each front leg and each back leg comprise two elongated metal plates 28 connected substantially along one of their lengths to an inside elongated metal plate 30 and connected along one of their widths to a bottom base plate 32, such that the two elongated metal plates 28 are normal to the bottom base plate 32. Each bottom base plate 32 may sit on a ground surface, when positioned on the ground. While each front leg 22 and back leg 24 is shown to be a substantially U-shaped channel, it is understood that they may be any shape, such as, for example, a tubular shape.

Figure 6:
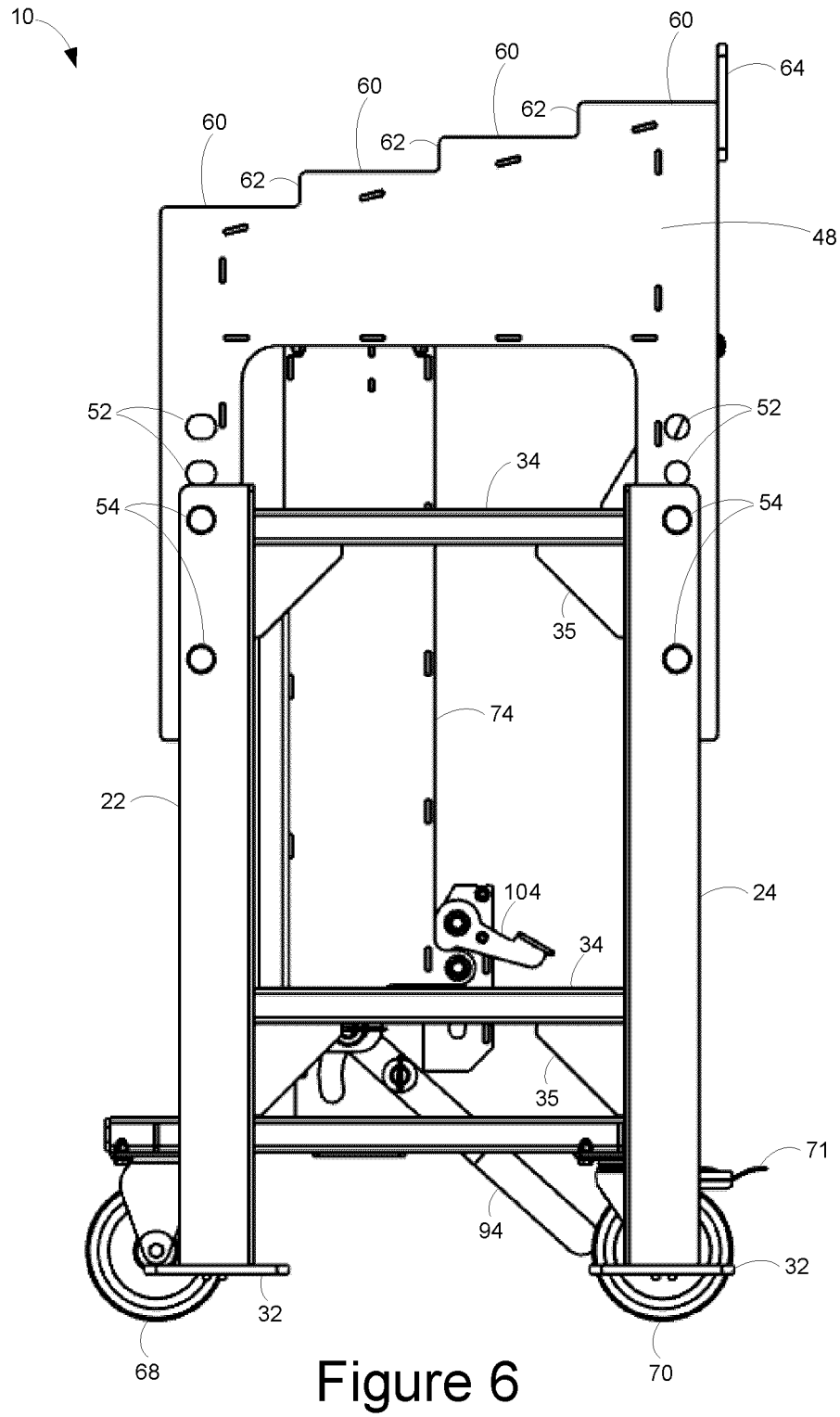
FIG. 6 shows a side view of the trailer stand of FIG. 1.

Each front leg 22 and each back leg 24 may be connected by at least one cross support 34. While two cross supports are shown in FIGS. 1 and 6, it is understood that any number of cross supports may be employed to ensure the stability of the frame 12. Each cross support 34 may be connected to a gusset 35 under each cross support 34 where the cross support connects to each leg 22, 24. The gussets 35 may be made from a metal sheet or plate and may be substantially triangular in shape; however, any shaped gusset 35 may be employed to create the appropriate amount of reinforcement to the trailer stand and frame.

Figure 2:
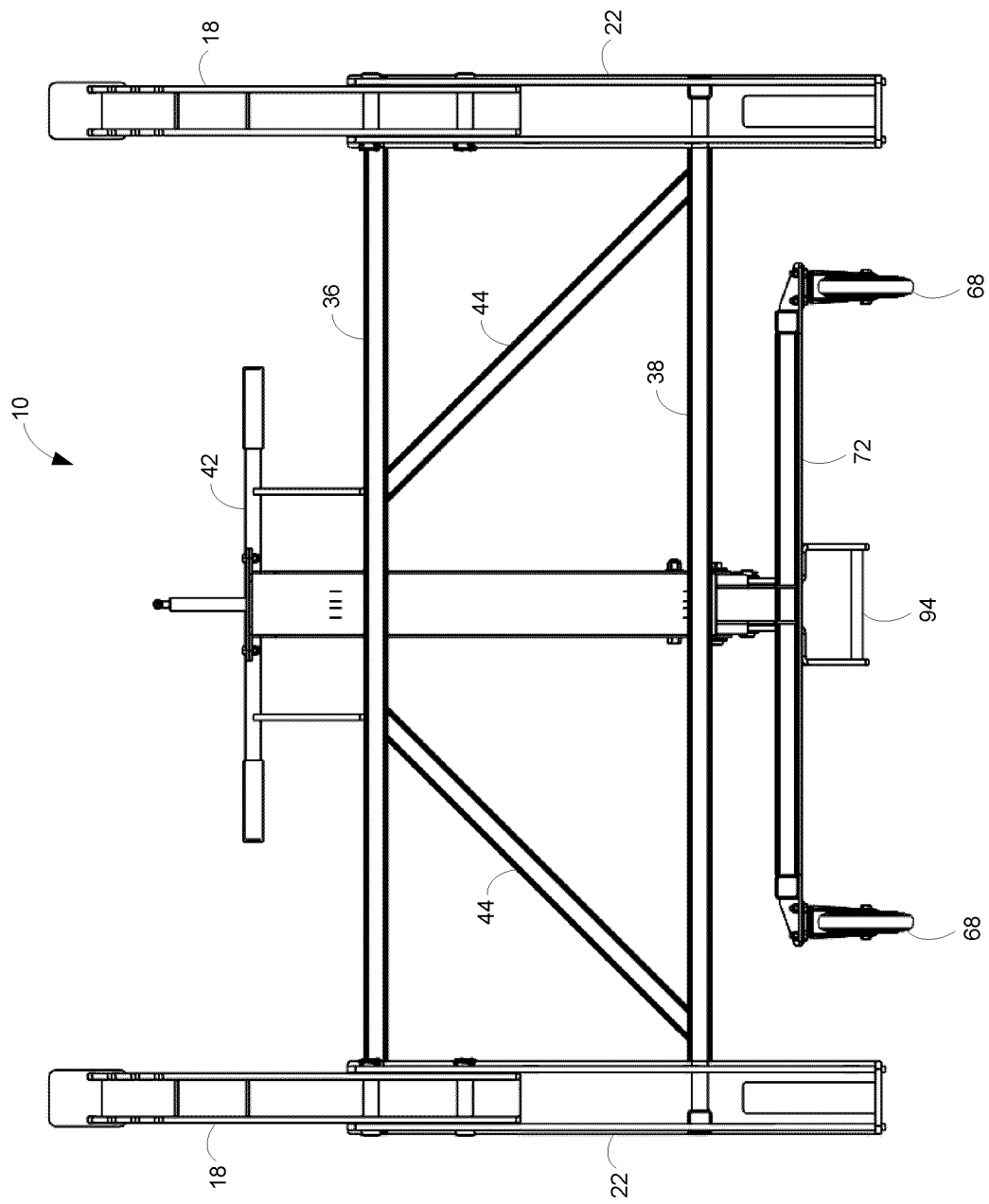
FIG. 2 shows a front view of the trailer stand of FIG. 1.
Figure 3:
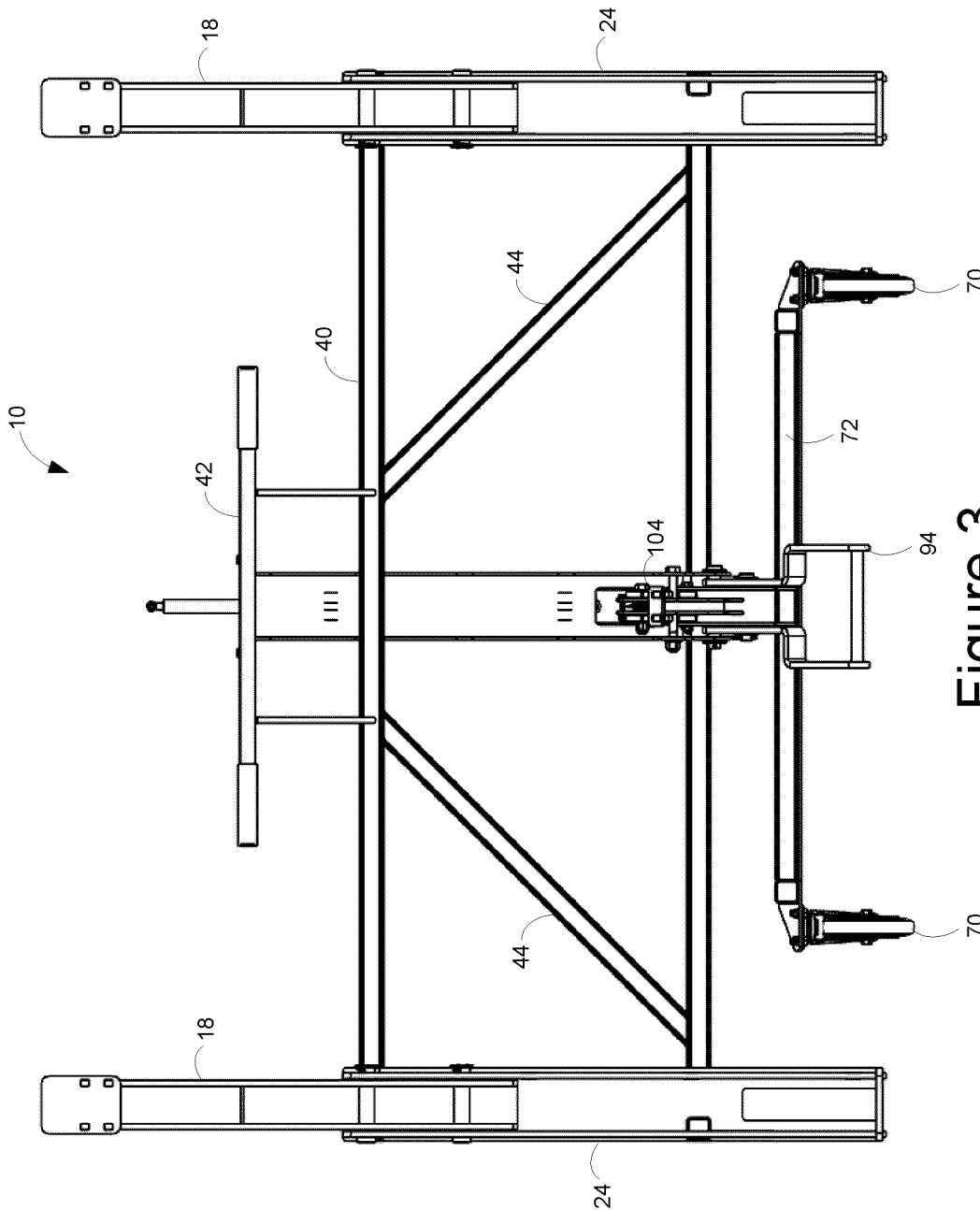
FIG. 3 shows a rear view of the trailer stand of FIG. 1.
Figure 4:
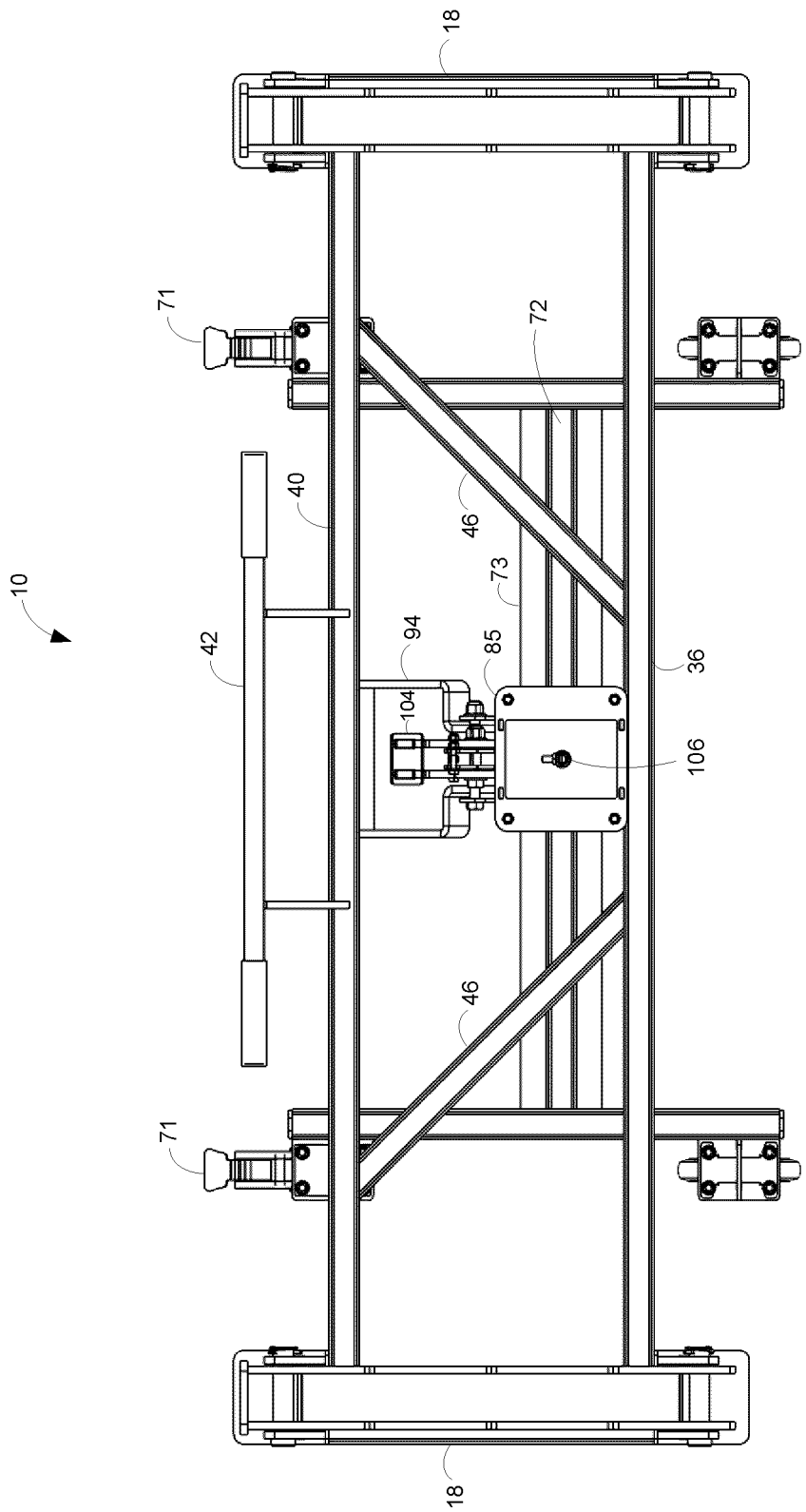
FIG. 4 shows a top view of the trailer stand of FIG. 1.
Figure 5:
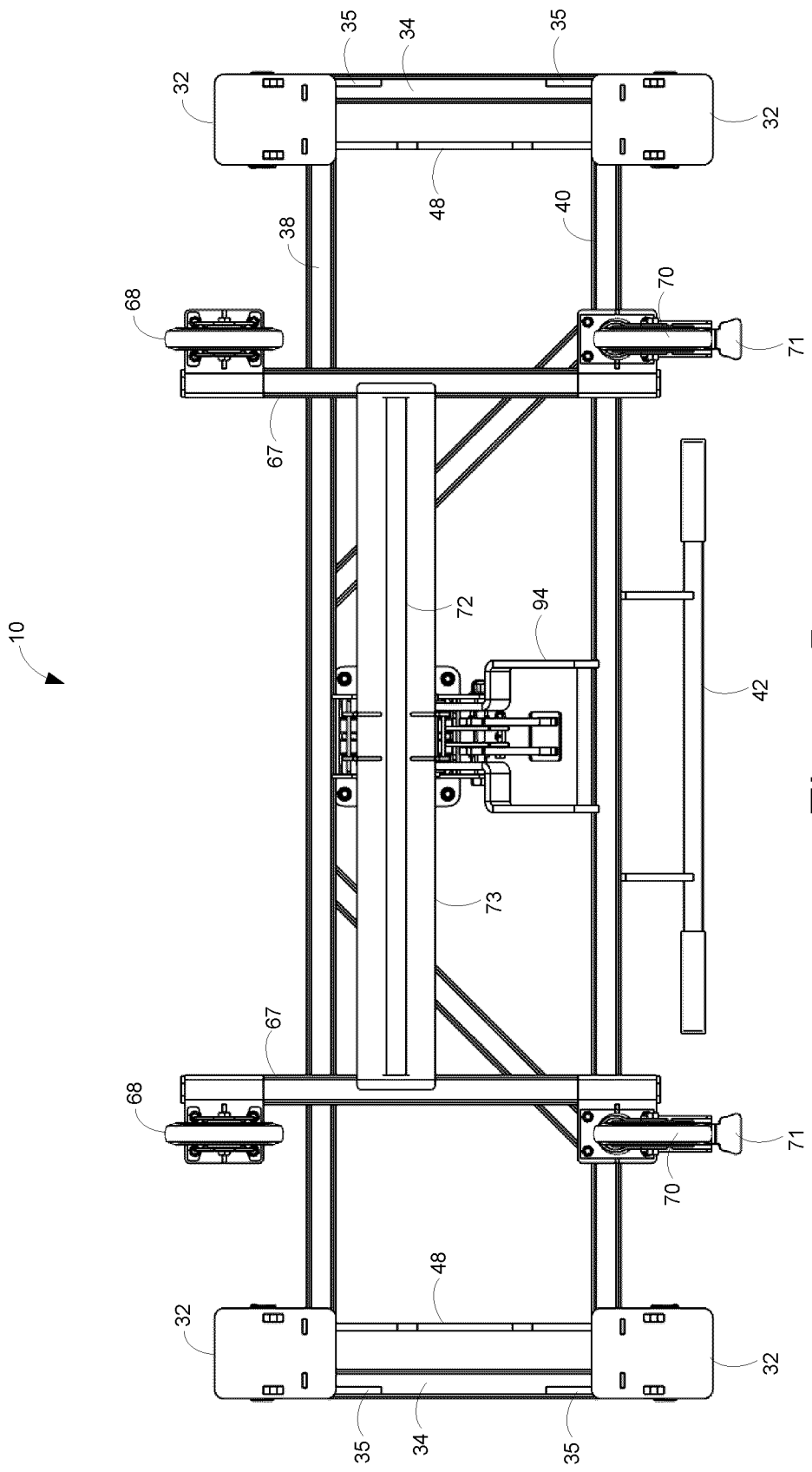
FIG. 5 shows a bottom view of the trailer stand of FIG. 1.

Each leg assembly 20 may be connected by a plurality of cross supports, traversing the width of the trailer stand 10, creating the frame 12 around the lifting system 14. The plurality of cross supports may be of a width wide enough so that the trailer stand 10 is wide enough to support the full width of a semi-trailer, approximately 66". However, while the figures show a wide frame, it is understood that the trailer stand 10 may accommodate a frame 12 of any width. FIG. 2 and FIG. 7 show the frame 12 to have a top front cross support 36, connected to the upper portion of each front leg, for example, the top of each front leg 22. The frame may also have a bottom front cross support 38, shown in FIG. 2 and FIG. 7, connected to the lower portion of each front leg 22. The frame 12 may also have a top back cross support 40 connected to the lower portion of each back leg 24, for example, the top of each back leg 24, as shown in FIG. 3 and FIG. 7. The top back cross support 40 may have a handle 42 for user operation. The handle 42 is shaped and positioned on the top back cross support 40 such that a user or operator is a safe distance away from the semi-trailer when positioning the trailer stand 10 underneath the front nose portion of the trailer. FIG. 2 and FIG. 7 show that the frame 12 may have two angled cross braces 44, connecting the top front cross support 36 to the bottom front cross support 38, to add stability to the frame 12. FIG. 4 shows that the frame 12 may also have two angled cross braces 46, connecting the top front cross support 36 to the top back cross support 40 to add stability to the frame. It is understood that while two angled cross braces 44, 46 are shown, any number of braces at any angle may be used to provide stability to the frame.

The cross supports and cross braces may be made from, but not limited to metal tubing, such as steel tubing.

Figure 8B:
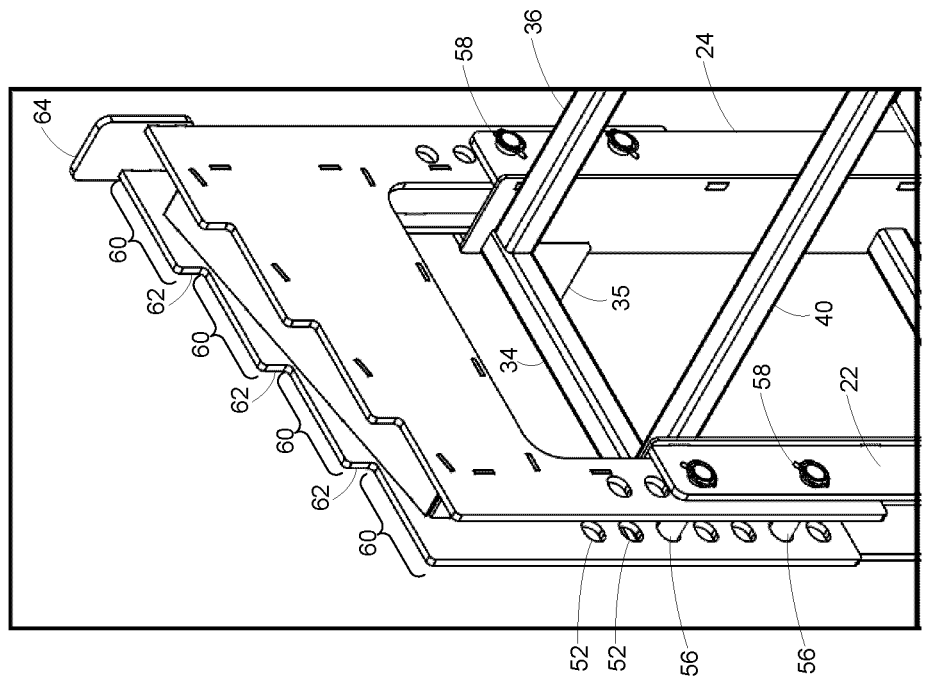
FIG. 8B shows a close-up view of the connection of the stepped landing assembly of FIG. 8A to the frame of FIG. 7.
Figure 8A:
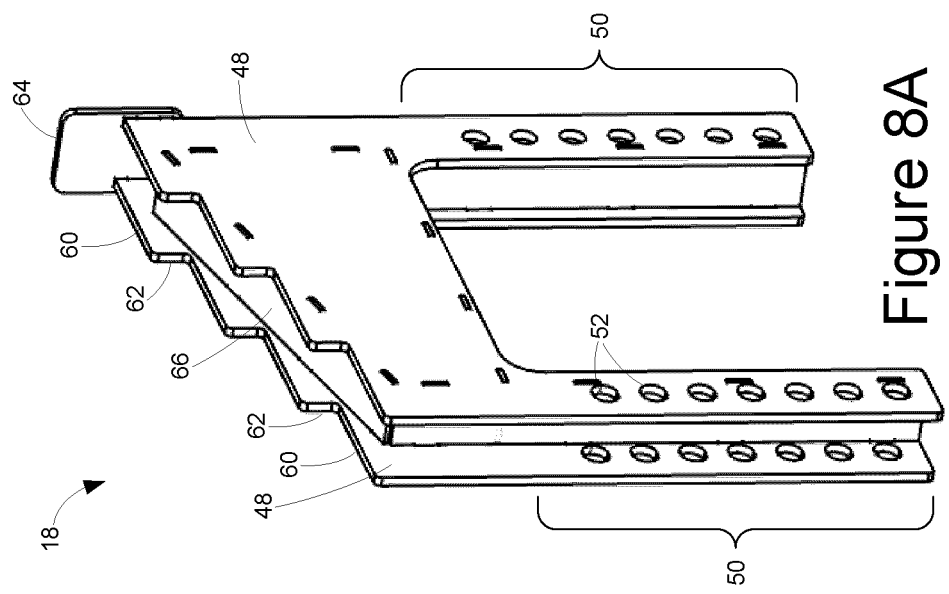
FIG. 8A shows a perspective view of a stepped landing assembly of the trailer stand of FIG. 1.

Each leg assembly 20 may support a stepped landing assembly 18 shown in FIG. 6. The stepped landing assembly 18, shown in more detail in FIG. 8A, may comprise two stepped walls 48, which are substantially symmetrical. The bottom of each stepped wall has, at each end, a downward arm 50, which fits within the channels created by the back and front legs 22, 24. Each of the downward arms 50 are connected by an elongated metal plate, thereby connecting the two stepped walls 48, to form the stepped landing assembly 18. Each of the downward arms 50 has a plurality of holes 52 which substantially align with holes 54 in the back and front legs 22, 24, to connect and lock the stepped landing assembly 18 to the back and front legs 22, 24, allowing the stepped landing assembly 18 to be adjusted for height. As shown in FIG. 8B, when the stepped landing assembly 18 is adjusted to an appropriate height, a clevis pin 56 may be placed in the appropriate hole 54 in the back (or front) leg, and inserted therethrough to the aligned hole 52 in the first downward arm 50 and therethrough to the aligned hole 52 in the second downward arm 50 therethrough to the aligned hole 54 on the other side of the leg 22, 24. The clevis pin 56 may be held in place by a suitable pin 58. While it is shown that the legs 22, 24 have two holes 54 to align with the holes 52 in the stepped landing assembly 18, it is understood that any number of holes is possible to connect the stepped landing assembly to the legs.

The top of each of the stepped walls 48 act much like stringers in stair construction, having treads 60 and risers 62, which align when each stepped wall is assembled to form the stepped wall assembly 18. The aligned treads 60 and risers 62 form stages or steps. A sloped plate 66 connects the tops of each stepped wall 48 below each riser 62. The sloped plate 66 connects the two stepped walls 48 together to make the weldment stronger by forming a box section. Another advantage of the sloped plate 66 is to assist in painting so that it is only the exterior of the weldment that needs to be painted and all painted surfaces are easily accessible for powder coating.

At the top of the back of the stepped wall assembly 18 is a stop plate 64, which is substantially higher than the top riser of the stepped wall assembly 18. The stop plate 64 allows an operator to position the trailer stand 10 under a semi-trailer, giving a visual indication for how far under the semi-trailer the trailer stand 10 may be positioned. The stop plate 64 acts a positioning aid and is a hard stop to prevent the trailer stand 10 from sliding too far underneath the trailer.

The pair of stepped assemblies 18 creates matched stepped landing areas on each side of the stand 10. While FIGS. 1 to 7 show a particular shape to the stepped walls 48 and to create the stepped landing assemblies 18, it is understood that any shape of the walls is feasible to create the stepped landing areas and to support a semi-trailer in the event of a free-fall or a tip. The trailer stand is positioned under a semi-trailer (not shown) until it reaches the one of the stepped landing areas with the height that corresponds with the height of the semi-trailer off the ground. This configuration means that whichever step is positioned under the semi-trailer, the "catch-zone" is between about 1" to about 3". In this configuration, the trailer stand is in the supporting position or mode such that if the landing gear of the trailer collapses or fails and the trailer begins to nose dive, the trailer will only dive about 1" to about 3" before the underside of the trailer engages the step in the "catch-zone". Once the trailer engages the step of the trailer stand in the "catch-zone", the trailer will be supported by the trailer stand preventing the trailer from nose-diving. In a configuration where the underside of the trailer engages one of the stepped landing areas while the trailer is being supported by its landing gear, i.e., a "catch-zone" of 0", the trailer stand is in the stabilizing position or mode. When the trailer stand is in the stabilizing position or mode, the trailer stand stabilizes the trailer against pitching, rolling and/or swaying when forklift drives in an out of the trailer to load and unload. In the stabilizing position or mode, the trailer stand also supports the trailer if the landing gear fails or collapses. If when the trailer stand is positioned under a semi-trailer and none of the stepped landing areas of the trailer stand engage with the underside of the trailer to place the trailer stand in the stabilizing position or mode, the operator can place the trailer stand into the stabilizing position or mode by adjusting the height of the stepped landing assemblies relative to the frame assembly until one of the stepped landing areas engages with the underside of the trailer. Accordingly, the height of the stepped landing assemblies 18 may be adjusted in relation to the frame 12 to ensure that one of the landing areas is at the appropriate height for a catch-zone. The height of the stepped landing assemblies 18 is adjusted by aligning the holes 52 in the downward arms 50 to the appropriate holes 54 in the legs 22, 24. In some embodiments, the steps and/or risers may be outfitted with bumpers made of rubber or other shock absorbent material for abutting the semi-trailer. Bumpers may protect the trailer stand and semi-trailer from damage and wear and tear.

Figure 9:
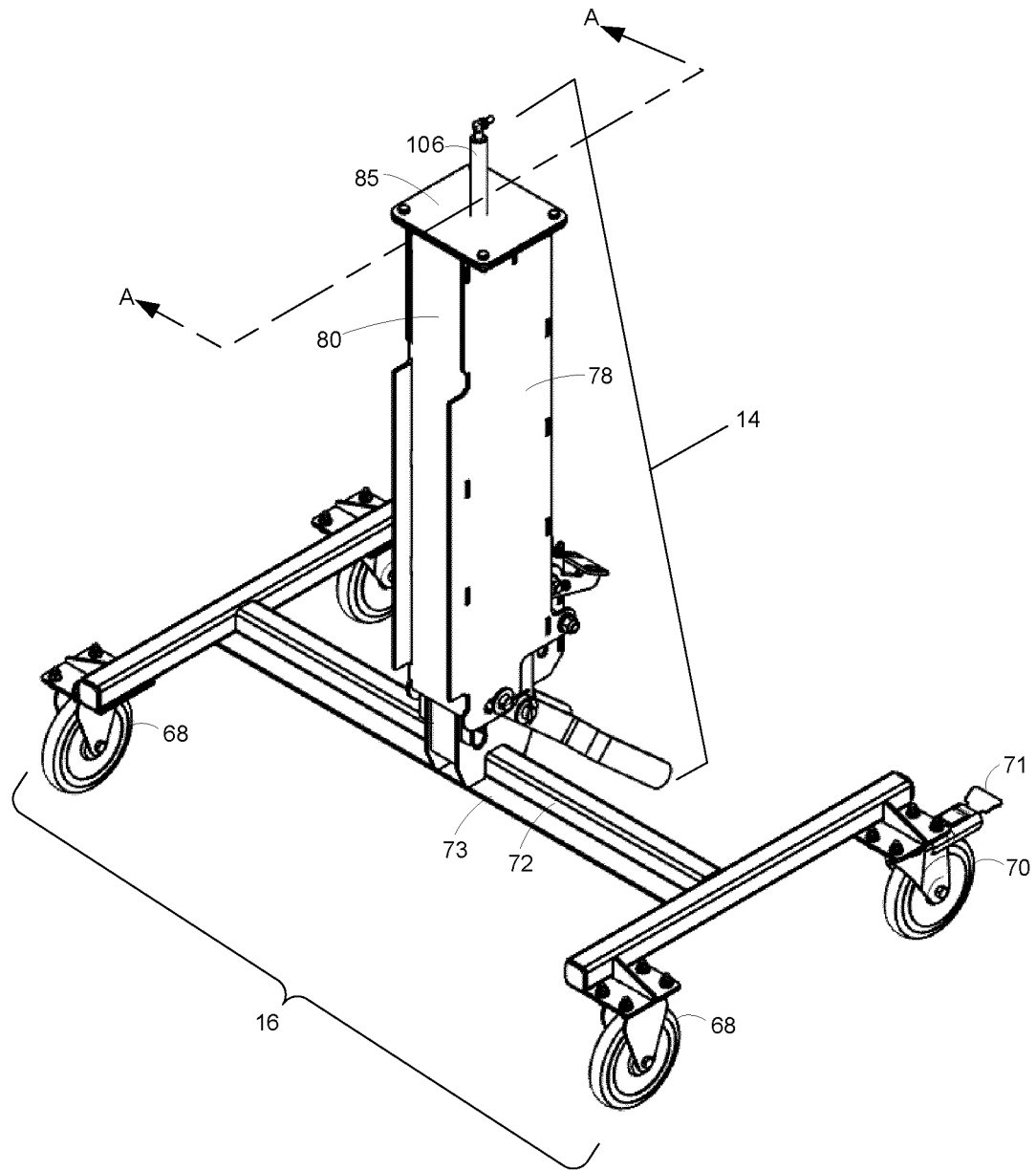
FIG. 9 shows a perspective view of the lifting system of the trailer stand of FIG. 1.
Figure 10:
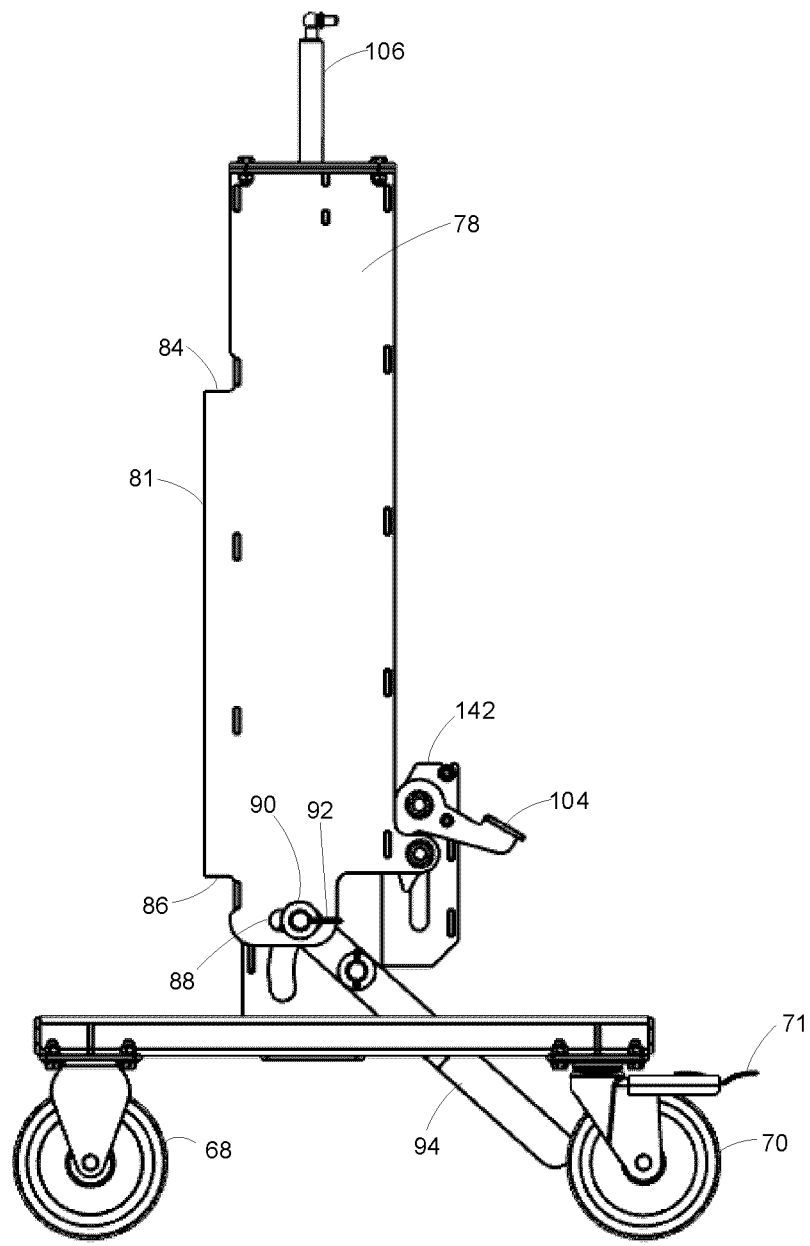
FIG. 10 shows a side view of the lifting system of FIG. 9.

FIG. 9 shows a perspective view of the lifting system 14 which is attached to a wheel assembly 16. FIG. 10 shows a side view of the lifting system 14 and the wheel assembly 16. The wheel assembly 16 may have a frame which comprises a pair of wheel bars 67 connected to a center bar 72. Each pair of wheel bars 67 having a front wheel or caster 68 and a back wheel 70. The front wheels 68 and/or back wheels 70 may have a locking mechanism or brake 71. The center bar 72 sits on a center base plate 73. Center base plate 73 acts as a stiffener for the wheeled base weldment adding strength and rigidity. While the example in the Figures show the trailer stand 10 to have four wheels or casters, it is understood that any number of wheels or casters may be used to accommodate the movement of the trailer stand 10.

Figure 11:
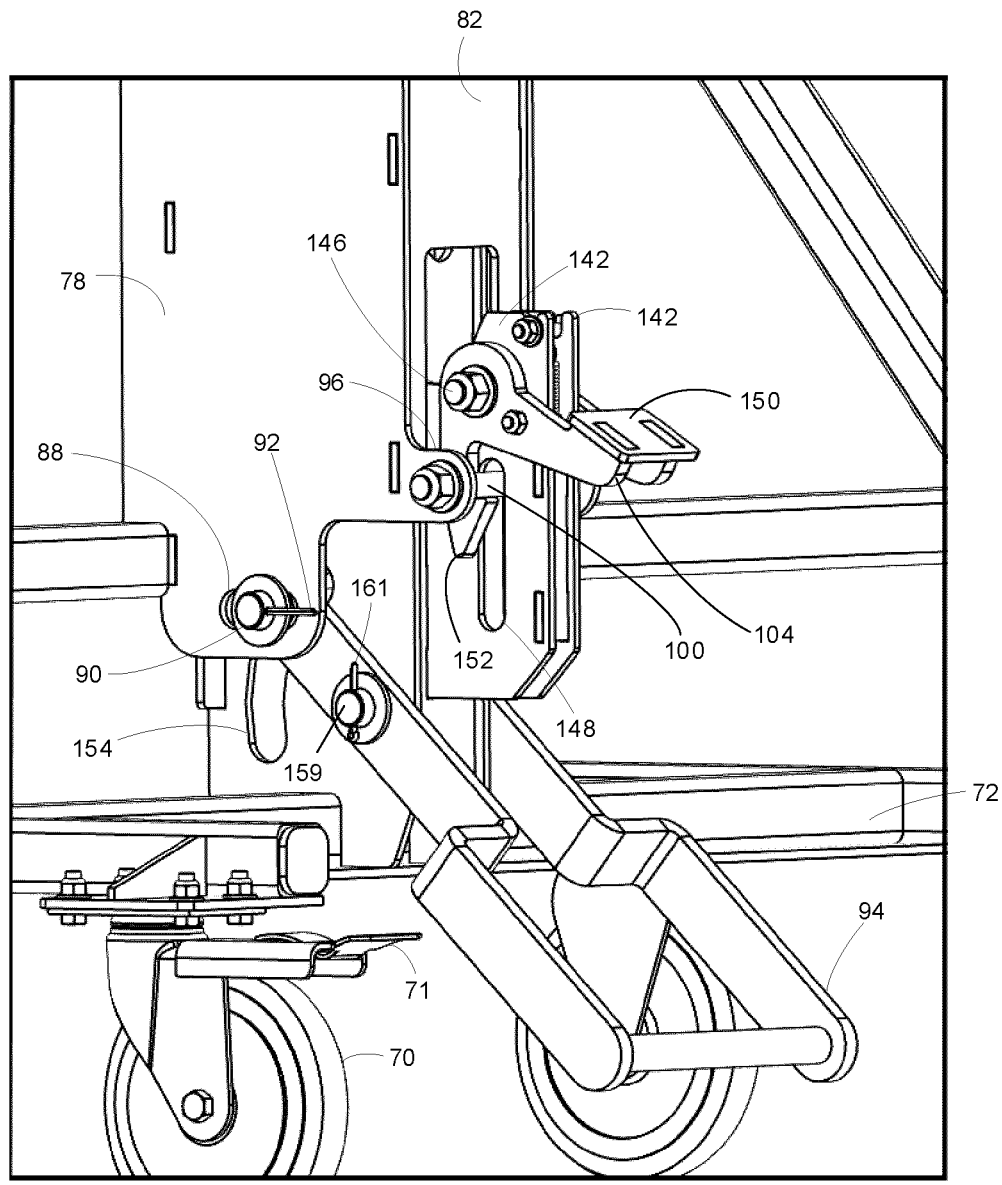
FIG. 11 shows a close up perspective view of the lifting system.

The lifting system 14 is connected to the center bar 72. The lifting system 14 may have a lifting system outer housing 74 made of metal plating. The outer housing 74 may be substantially oblong, comprising two side plates 78, a front plate 80 and a back plate 82, which are connected at their edges to form a box or tube shape. The outer housing 74 may also have a top plate 85. The two side plates 78 are substantially symmetrical and are cut such that a portion 81 of the side plate extends past the front plate 80 to form a notch 84 which may accommodate and connect to the top front cross support 36, and another notch 86 which may accommodate and connect to the bottom front cross support 38. In FIG. 11, the side plates 78 are shown to also have a bottom protrusion having a slot 88 to accommodate a connection to a lever 94 (shown in FIG. 15) on the inside surface of the side plate 78, by a clevis pin 90 through the slot 88 and an appropriate pin 92 to secure the clevis pin 90. FIG. 11 shows the side plates to have a protrusion 96 extending past the back plate 82. This protrusion 96, on each side plate 78, has a hole 98 for accommodating a bolt 100 therethrough to connect a portion of an inner housing 102 to the outer housing 74. The bolt 100 acts in conjunction with a pedal 104 to lock the frame 12 when moved from a lowered position, wherein the trailer stand 10 is in the supporting and/or stabilizing position, to a raised position, wherein the trailer stand 10 is in the portable position, which will be discussed in further detail below.

Within the outer housing, the lifting system comprises an inner housing 102 which houses a gas spring or shock 106, activated by the lever 94. The inner housing 102 is shown in more detail in FIGS. 12 and 13. The inner housing 102 comprises two side plates 108 connected by a first front plate 110 and a second front plate 112 at their fronts, and by a first back plate 114 and a second back plate 116 at their backs. While FIGS. 12 and 13 show the front plates 110, 112, and back plates 114, 116 to be connected to the side plates 108 via tabs in notches, it is understood that any connection means is possible. The bottom of each of the side plates 108 have a notch 109 to accommodate and connect to the center bar 72.

The gas spring or shock 106 is connected at its bottom end to an inner plate 117 in the inner housing 102. The inner plate 117 traverses the width of the space between, and is connected to, the two side plates 108. The gas spring or shock 106 is also connected to the top of the outer housing 74 by a top center plate 119, which traverses the width of the space between the two side plates 78 of the outer housing 74. The gas spring or shock 106 may protrude through the top plate 85 of the outer housing 74.

Figure 14:
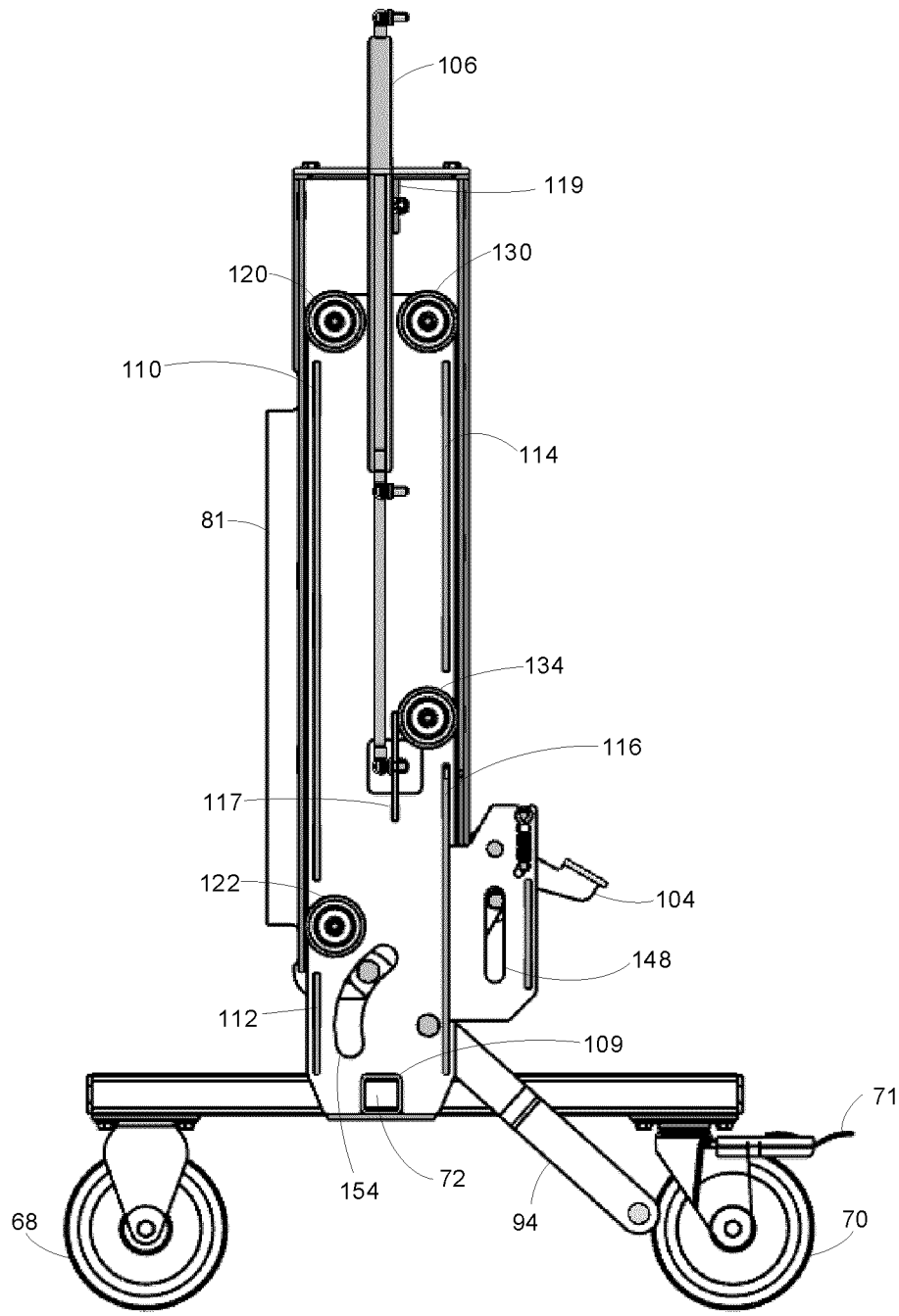
FIG. 14 shows a section view of the lifting system along the A-A line of FIG. 9.

The first front plate 110 is positioned to allow a top front pair of wheels 120 (shown in FIG. 14) to engage the inside surface of the front plate 80 of the lifting system outer housing 74. The top front pair of wheels 120 are on an axle (not shown), which is accommodated in the side plates 108 by a hole 118 therethrough. The second front plate 112 is positioned below the first front plate 110 to leave a space to allow a bottom front pair of wheels 122 (shown in FIG. 14) to engage the inside surface of the front plate 80 of the lifting system outer housing 74. The bottom front pair of wheels 122 are on an axle (not shown), which is accommodated in the side plates 108 by holes 128 therethrough. The first back plate 114 is positioned to allow a top back pair of wheels 130 (shown in FIG. 14) to engage the inside surface of the back plate 82 of the lifting system outer housing 74. The top back pair of wheels 130 are on an axle (not shown), which is accommodated in the side plates 108 by a hole 132 therethrough. The second back plate 116 is positioned below the first back plate 114 to leave a space to allow a bottom back pair of wheels 134 (shown in FIG. 14) to engage the inside surface of the back plate 82 of the lifting system outer housing 74. The bottom back pair of wheels 134 are on an axle (not shown), which is accommodated in the side plates 108 by a hole 136 therethrough. The bottom back pair of wheels 134 may also engage the inner plate 117 in the inner housing 102 on the opposite side to the back plate 82. While FIG. 14 shows that there are 4 pairs of wheels, it is understood that any number of pairs of wheels may be utilized.

The side plates 108 each have a curved slot 154. The curved slots 154 accommodate the clevis pin 90 therethrough and locked in place by an appropriate pin 92. The curved slots 154 align with a hole 158 in the end of the lever, thereby holding the end of the lever 94, such that the end of the lever 94 sits between the outer housing 74 and the inner housing 102. The side plates 108 each have a hole 156 for accommodating a clevis pin 159 therethrough and locked in place by an appropriate pin 161. The holes 156 on the side plates 108 align with a hole 160 at a midway point on the lever 94 (seen in FIG. 15) arms which also accommodate the clevis pin 159. The clevis pin 159 acts as an axis of rotation for the lever. The curved slots 154 limit the movement of the lever 94.

Figure 15:
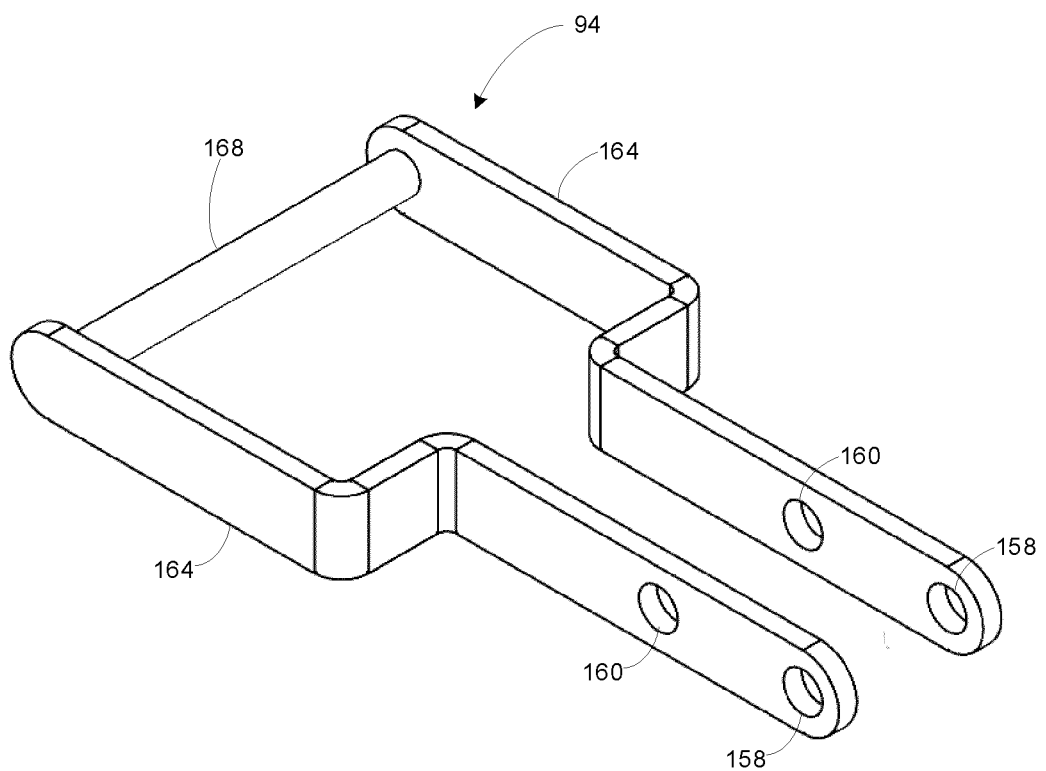
FIG. 15 shows a perspective view of the lever of the lifting system.

FIG. 15 shows the lever 94 in more detail. The lever 94 may have two bent arms 164. The arms have hole 158 at their ends to accommodate clevis pin 90, as described above. The arms 164, may have another hole 160 at a substantially midway point on the arm to accommodate clevis pin 159 as described above. The lever 94 may also accommodate a handle 168 at the opposite end where an operator may depress their foot. While the Figures show the lever 94 to have a particular shape to the lever, a skilled worker would understand that any shape of lever is possible.

The second back plate 116 has slots (not shown) to allow for the connection of a bracket 140. The bracket 140 comprises two plates 142 that fit into slots in second back plate 116. The two plates 142 have a hole 144 to accommodate a bolt 146, traversing the holes 144 therethrough in each plate 142 to which the pedal 104 is pivotally connected and which acts as the axis of rotation for the pedal 104. The two plates 142 have an oblong slot 148 which accommodates the bolt 100, allowing the bolt 100 to slide up and down the oblong slot 148, thereby allowing the outer housing to move up and down, which in turn moves the frame 12 up and down. The pedal 104 is substantially L-shaped, having a foot pad 150 for depression by an operators foot. The pedal 104 has a hook 152 at one end to automatically engage and lock the bolt 100 when the outer housing 74 is moved up, thereby moving and locking the frame 12 in the raised position, wherein the trailer stand 10 is in the portable position. To release outer housing 74 and frame 12 from the raised position, an operator manually depresses the foot pad 150, pivoting the hook 152, and releasing the bolt 100, allowing the outer housing 74 to move down, and thereby allowing the frame 12 to move down to the lowered position, wherein the trailer stand is in the supporting and/or stabilizing position.

All the figures show the frame 12 of the trailer stand 10 in the raised position. When the frame 12 is in the raised position, the trailer stand 10 is in the portable position and is free to be moved and positioned by an operator by pushing or pulling the trailer stand 10 by the handle 42. Once the trailer stand 10 is positioned under a semi-trailer, the operator will release the pedal 104 by depressing the foot pad 150, thereby releasing the bolt 100. The operator may press the lever 94 upwards with their foot, causing the clevis pin 90, and thereby the end of the lever 94 to move down the curved slot 154, which in turn causes the outer housing 74 to move down. Because the outer housing 74 is attached to the frame 12, the frame 12 also moves down to the lowered position until the base plate 32 engages the ground, wherein the trailer stand 10 is in the supporting and/or stabilizing position.

To move the trailer stand 10, the frame 12 is moved to the raised position, wherein the trailer stand 10 is in the portable position. To move the frame 12 to the raised position, the operator may press the lever 94 downwards, which engages the gas spring or shock 106 to expand. Because the gas spring or shock 106 is connected to the outer housing 74 at the top center plate 119, the outer housing 74 moves up as the gas spring or shock 106 expands. The movement of the outer housing 74 is aided by the pairs of wheels 120, 122, 130, 134 in the inner housing 102. Because the end of the gas spring or shock 106 is fixed to the inner housing 102 at the inner plate 117, the gas spring or shock 106 is limited in its expansion since the inner housing 102 is fixed and does not move, which limits the movement of the outer housing 74 upwards. As the inner housing 102 moves to the raised position, the frame 12 rises to the raised position, lifting the legs 22, 24 off the ground to place the trailer stand 10 into the portable position and allowing the trailer stand 10 to be moved.

Although the lifting mechanism or system has been shown as comprising a gas spring or shock 106 as the driving mechanism, the driving mechanism may be any driving mechanism known to persons skilled in this art that is capable of moving the frame between the lowered and raised positions, including hydraulically, pneumatically, electrically, mechanically, electromechanically and the like. It will be understood that combinations of different types of driving mechanisms would be possible in the trailer stand according to the present invention. For example, in an embodiment, the driving mechanism may be a scissor-type driving device. In another embodiment, the driving mechanism may be a piston-type driving device. In another embodiment, the driving mechanism may be a jack screw assembly. In another embodiment, the driving mechanism may be a linear actuator, including but not limited to, mechanical actuators, hydraulic actuators or cylinders, pneumatic actuators or cylinders, linear motors, telescoping linear actuators and the like.

The width of trailer stand 10, in this example, is determined by knowing the width of standard semi-trailers. This way, if the landing gear of a semi-trailer were to collapse while a forklift were inside, the trailer stand 10 would be able to support the weight sufficiently as the semi-trailer comes down and engages the trailer stand 10. In this manner, the trailer stand 10 would prevent the semi-trailer from tipping forward or to one side. However, the trailer stand 10 may be wider or narrower depending on the needs of the operators and the dimensions of the semi-trailers. In some embodiments, the trailer stand 10 has a width of about 60" to about 70". Because of the shape of the trailer stand 10, it is able to support up to about 100,000 lb of load.

While the embodiments of Figures show the trailer stand 10 to have a certain number of steps and risers, it is understood that the trailer stand 10 may have any number of steps of any length or width, and any number of risers of any height or width to accommodate a semi-trailer.

In some embodiments, trailer stand 10 may be outfitted to be placed beneath a semi-trailer by a shunt truck, a forklift, yard jockey or by a vehicle via a trailer hitch.

It is understood that all connections of the parts are metal unless otherwise stated. Metals such as, but not limited to, steel, galvanized steel, cold rolled steel, or steel tubing may be used for the parts. It is understood that all parts are welded in place, unless otherwise stated. However, any connection means between the parts are possible.

Unless otherwise explained, all technical and scientific terms used herein have the same meaning as commonly understood by one of ordinary skill in the art to which this disclosure belongs. Although any methods and materials similar or equivalent to those described herein can be used in the practice for testing of the present invention, the typical materials and methods are described herein. In describing and claiming the present invention, the following terminology will be used.

It is also to be understood that the terminology used herein is for the purpose of describing particular aspects only and is not intended to be limiting. Patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known acceptable additive, excipient, diluent, carrier, and the like.

It will be understood that any component defined herein as being included may be explicitly excluded from the claimed invention by way of proviso or negative limitation.

In addition, all ranges given herein include the end of the ranges and also any intermediate range points, whether explicitly stated or not.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin exempli gratia, and is used herein to indicate a non-limiting example. Thus, the abbreviation "e.g." is synonymous with the term "for example." The word "or" is intended to include "and" unless the context clearly indicates otherwise.

What is claimed is:

1. A trailer stand for supporting a trailer parked on a surface, the trailer having an underside, the trailer stand comprising:
   a frame assembly having a top end and a bottom end, the bottom end of the frame assembly for engaging the surface and the top end of the frame assembly for engaging the trailer;
   a stepped assembly located at the top end of the frame assembly, the stepped assembly comprising a plurality of landing areas for engaging the underside of the trailer.

2. The trailer stand of claim 1, wherein the stepped assembly comprises a plurality of risers in between the plurality of landing areas, the plurality of risers for engaging a vertical wall of the trailer.

3. The trailer stand of claim 1, wherein the frame assembly has a front end and a back end, the front end having a pair of front legs and the back end having a pair of back legs.

4. The trailer stand of claim 3, wherein the stepped assembly is a pair of stepped assemblies, each of the pair of stepped assemblies connected to the top of one of the pair of front legs and one of the pair of back legs, the pair of stepped assemblies providing the plurality of landing areas for the underside of the trailer.

5. The trailer stand of claim 1, wherein each landing area of the plurality of landing areas has a tread to act as a catch-zone for the underside of the trailer.

6. The trailer stand of claim 1, further comprising a wheel assembly having a wheel assembly frame, the wheel assembly frame comprising at least two wheels.

7. The trailer stand of claim 6, wherein the wheel assembly frame comprises at least three wheels.

8. The trailer stand of claim 6, wherein the wheel assembly frame comprises at least two wheel bars connected to a center bar, each of the at least two wheel bars having a front wheel and a back wheel.

9. The trailer stand of claim 6, further comprising a lifting system connected to the wheel assembly and to the frame assembly, the lifting system configured to raise and lower the frame assembly relative to the wheel assembly.

10. The trailer stand of claim 9, wherein the lifting mechanism is operatively coupled with the frame assembly via a linkage.

11. The trailer stand of claim 9, wherein the lifting system comprises an inner housing within an outer housing, the inner housing connected to the wheel assembly, the outer housing connected to the front end of the frame assembly, the outer housing configured to move to a raised position to lift the frame assembly.

12. The trailer stand of claim 11, wherein the outer housing is configured to move to a raised position via a driving mechanism fixed to the inner housing.

13. The trailer stand of claim 12, wherein the driving mechanism is a jack screw assembly.

14. The trailer stand of claim 12, wherein the driving mechanism is a gas spring.

15. The trailer stand of claim 12, wherein the driving mechanism is a gas shock.

16. The trailer stand of claim 9, wherein the lifting system comprises an inner housing within an outer housing, the inner housing connected to the center bar, the outer housing connected to the front end of the frame assembly, the outer housing configured to move to a raised position to lift the frame assembly.

17. The trailer stand of claim 16, wherein the outer housing is configured to move to a raised position via a driving mechanism fixed to the inner housing.

18. The trailer stand of claim 17, wherein the driving mechanism is a jack screw assembly.

19. The trailer stand of claim 17, wherein the driving mechanism is a gas spring.

20. The trailer stand of claim 17, wherein the driving mechanism is a gas shock.

\* \* \* \* \*